United States Patent

Miyoshi et al.

[11] Patent Number: 5,570,309
[45] Date of Patent: Oct. 29, 1996

[54] ITERATIVE ARITHMETIC PROCESSOR

[75] Inventors: Akira Miyoshi; Yuiti Hashimoto, both of Osaka, Japan

[73] Assignee: Matsushita Electric Industrial Co., Ltd., Osaka, Japan

[21] Appl. No.: 262,866

[22] Filed: Jun. 21, 1994

[30] Foreign Application Priority Data

Jun. 21, 1993 [JP] Japan ..................... 5-148907

[51] Int. Cl.⁶ ................ G06F 7/00; G06F 7/38
[52] U.S. Cl. ..................... 364/746.2; 364/736
[58] Field of Search ................ 364/736, 746.2

[56] References Cited

U.S. PATENT DOCUMENTS

| | | | |
|---|---|---|---|
| 4,935,892 | 6/1990 | Nishiyama | 364/746.2 |
| 4,985,861 | 1/1991 | Yamashina et al. | 364/746.2 |
| 5,031,136 | 7/1991 | Nishiyama et al. | 364/746.2 |
| 5,040,138 | 8/1991 | Maher, III | 364/746.2 |
| 5,153,847 | 10/1992 | Takagi et al. | 364/746.2 |
| 5,251,166 | 10/1993 | Ishida | 364/746.2 |

FOREIGN PATENT DOCUMENTS 1-195574  8/1989  Japan.

Primary Examiner—Tan V. Mai
Attorney, Agent, or Firm—McDermott, Will & Emery

[57] ABSTRACT

A mantissa $X_{Mk}$, which satisfies $1 \leq X_{Mk} < 2$, is fed to a mantissa process section in order that the iterative multiplication operation of normalized floating-point numbers $X_k$ $(k=0, \ldots, m)$, written $P = X_0 \times X_1 \times X_2 \times 0 \ldots \times X_m$, is performed. In the mantissa process section, a product represented in RB (redundant binary) number representation is stored in a register, and such a product is fed back to a multiplier without being converted into a binary number. A shifter for one-place right-shift is provided between the multiplier and the register. A converter sequentially converts each RB number stored in the register into a binary number and provides to the shifter a shift-amount signal $S_1$ whose value varies with the result of such RB-to-binary number conversion. If a digit that is positioned upward two places from the binary point of a binary number obtained by the conversion is 0, then the value of $S_1$ is set to 0. If such a digit is 1, then the value of $S_1$ is set to 1.

30 Claims, 12 Drawing Sheets

F I G .12
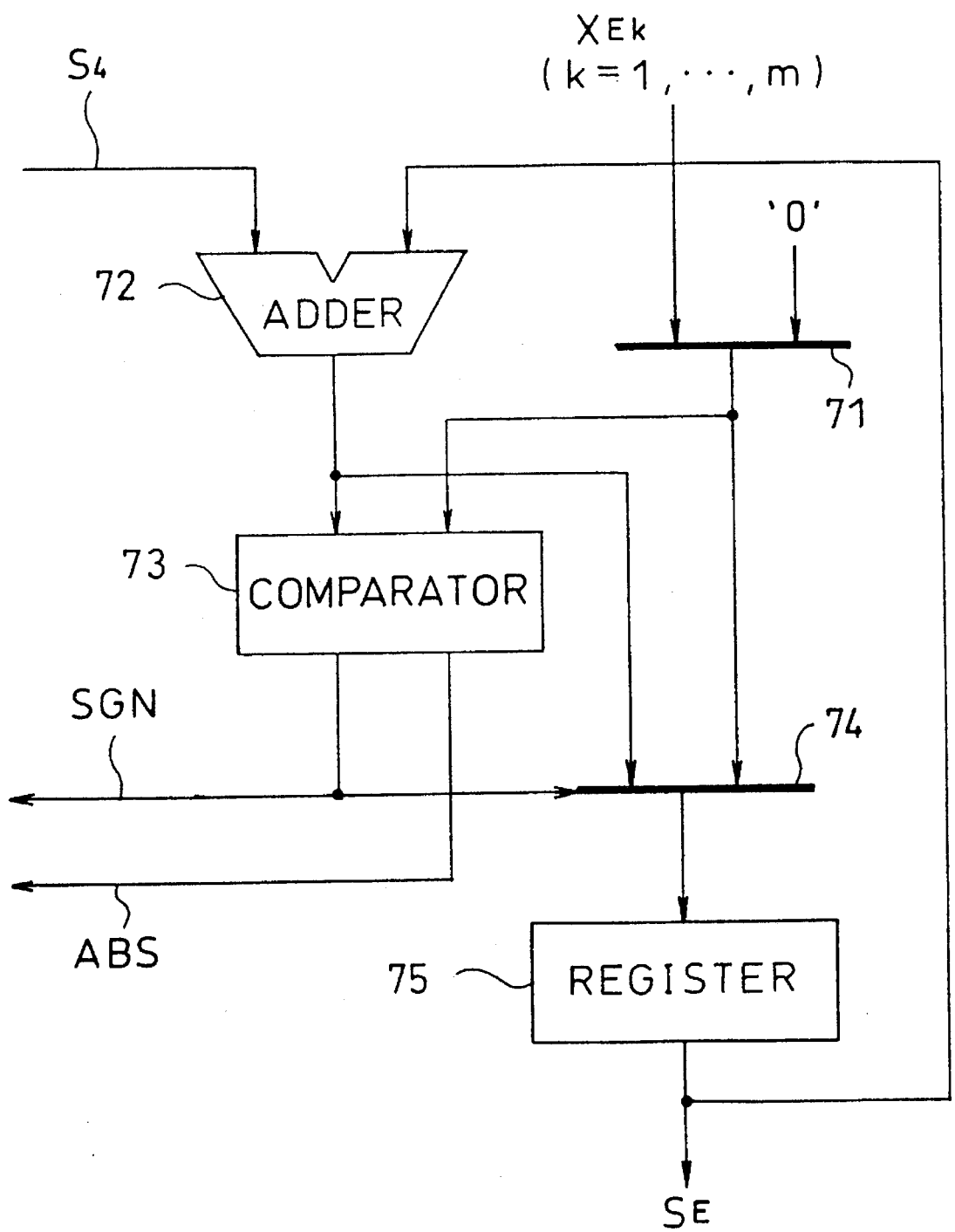

ITERATIVE ARITHMETIC PROCESSOR

BACKGROUND OF THE INVENTION

This invention generally relates to iterative arithmetic processors, and more particularly to an apparatus capable of repeatedly performing the arithmetic operation of normalized floating-point numbers, at high speed and with less hardware.

Japanese Patent Application, which has been published under Pub. No. 1-195574 and whose corresponding U.S. application was granted a patent under U.S. Pat. No. 4,985,861, shows an iterative multiplication processor. This processor comprises a first converter for performing the conversion of a binary number into a singed digit (SD) number; an SD multiplier for performing the multiplication operation of two SD numbers to find a product represented in SD number representation; a register for holding a product represented in SD number representation; and a second converter for performing the conversion of an SD number into a binary number. The SD multiplier has two input ports, at one of which an SD number from the first converter is supplied and at the other of which an SD number from the register is supplied. This prior art multiplication processor realizes high-speed iterative multiplication operations by feeding a product represented in SD number representation back to the SD multiplier, without subjecting such a product to an SD-to-binary conversion process.

This prior art shows another iterative multiplication processor that further includes a single shifter. Such a shifter, however, is arranged outside the feedback loop and is provided between the register and the second converter.

IEEE Std 754 defines the notation system for the single precision binary floating-point number made up of 32 bits of which one bit indicates the sign S, eight bits indicate the exponent E, and the remaining 23 bits indicate the fraction F. The exponent E and the fraction F are adjusted in order that a virtual non-zero value bit (i.e., implied 1) and a binary point are positioned upward of the leftmost bit of the fraction F. This adjustment is called the normalization. A bias of 127 is added to an actual exponent to make such a biased exponent positive. In other words, a real number RN representing a single precision binary floating-point number can be written:

$$RN = (-1)^S 2^{E-127}(1.F) \qquad (1)$$

where 1.F represents a mantissa M. The mantissa M is a binary number made up of 24 digits including a non-zero value digit that is positioned upward one place from the binary point thereof, the magnitude of which is $1 \leq M < 2$.

Suppose that the latter iterative multiplication processor of the above-described prior art performs iterative multiplication operations in which the mantissa M of a normalized floating-point number serves as input data. In this case, it is only after the SD multiplier has completed every multiplication operation that the result of the arithmetic operation fetched from the register is right-shifted. A firstly-found product $U_1$ by the SD multiplier falls within the range of $1 \leq U_1 < 2^2$, and when converted into a binary number, it may have a non-zero value digit that is positioned upward two places from the binary point thereof. This product $U_1$ is stored in the register. A secondly-found product $U_2$ falls within the range of $1 \leq U_2 < 2^3$, and, when converted into a binary number, it may have a non-zero value digit that is positioned upward three places from the binary point thereof. The register stores this product $U_2$ in place of the previously found product $U_1$. When input data supplied at one of the input ports of the SD multiplier and input data of the register are converted into binary numbers, the positions of their leftmost non-zero value digits are shifted to the left depending upon the multiplication repeat count. Therefore, the number of digits making up data to be processed by the SD multiplier and the register increases. As a result, when determining the size of circuitry for the SD multiplier and the register, the maximum value of the repeat count must previously be estimated. This produces the problem that the circuitry size increases with the repeat count.

SUMMARY OF THE INVENTION

The present invention is directed to provide a technique capable of performing iterative arithmetic operations including iterative multiplication operations of normalized floating-point numbers with less hardware at high speed.

A right-shift shifter is arranged between an SD processor and a register. The amount of the right-shift operation by the shifter is determined according to the result of the conversion of SD numbers each indicative of an intermediate result at each iterative stage into binary numbers, and the SD numbers are subjected to a right-shift process one after another.

The present invention uses not an SD number but a binary number representing an intermediate result to correctly identify the position of the leftmost non-zero value digit upward of the binary point of an intermediate result of the iterative arithmetic operation.

The above is explained taking an example of the iterative multiplication operation. The execution of the right-shift operation by the shifter depends on a specific digit that is positioned upward two places from the binary point of a binary number representing an intermediate result. Suppose that, at a certain iterative multiplication operation stage, an intermediate result $V_{k-1}$ represented in SD number representation is stored in the register ($1 \leq V_{k-1} 21\ 2^2$). This $V_{k-1}$ was found at a stage just one stage ahead of the existing stage, and, when converted into a binary number, it is likely to have a non-zero value digit that is positioned upward two places from the binary point thereof. The SD multiplier performs arithmetic operation to find a next arithmetic result $U_k$ using $V_{k-1}$. Concurrently, $V_{k-1}$ is converted into a binary number, and whether or not the shift operation by one place to the right is carried out is decided on the basis of a specific digit that is positioned upward two places from the binary point of the binary number obtained by such conversion. Then, $U_k$ is right-shifted by a given shift amount, and $V_k$, which is a result of the right-shift operation and now serves as a new intermediate result, is stored in the register. This $V_k$ falls within the range of $1 \leq V_k < 2^2$, and, when converted into a binary number, the leftmost position possible that a non-zero value digit of the obtained binary number can take is the same as the preceding intermediate result $V_{k-1}$. In accordance with the present invention, the number of digits making up data to be processed by the SD multiplier and the register is independent of the arithmetic operation repeat count; that is, such is fixed.

BRIEF DESCRIPTION OF THE DRAWINGS

FIG. 12 is a block diagram illustrating the organization of an exponent process section of the fourth embodiment.

DETAILED DESCRIPTION OF THE INVENTION

Different iterative arithmetic processors of the present invention are described by making reference to the accompanying drawings. In the present invention, SD numbers of radix 2 (i.e. redundant binary (RB) numbers) are used. SD numbers of other radixes other than radix 2, of course, are useful.

EXAMPLE 1

Figure 1:
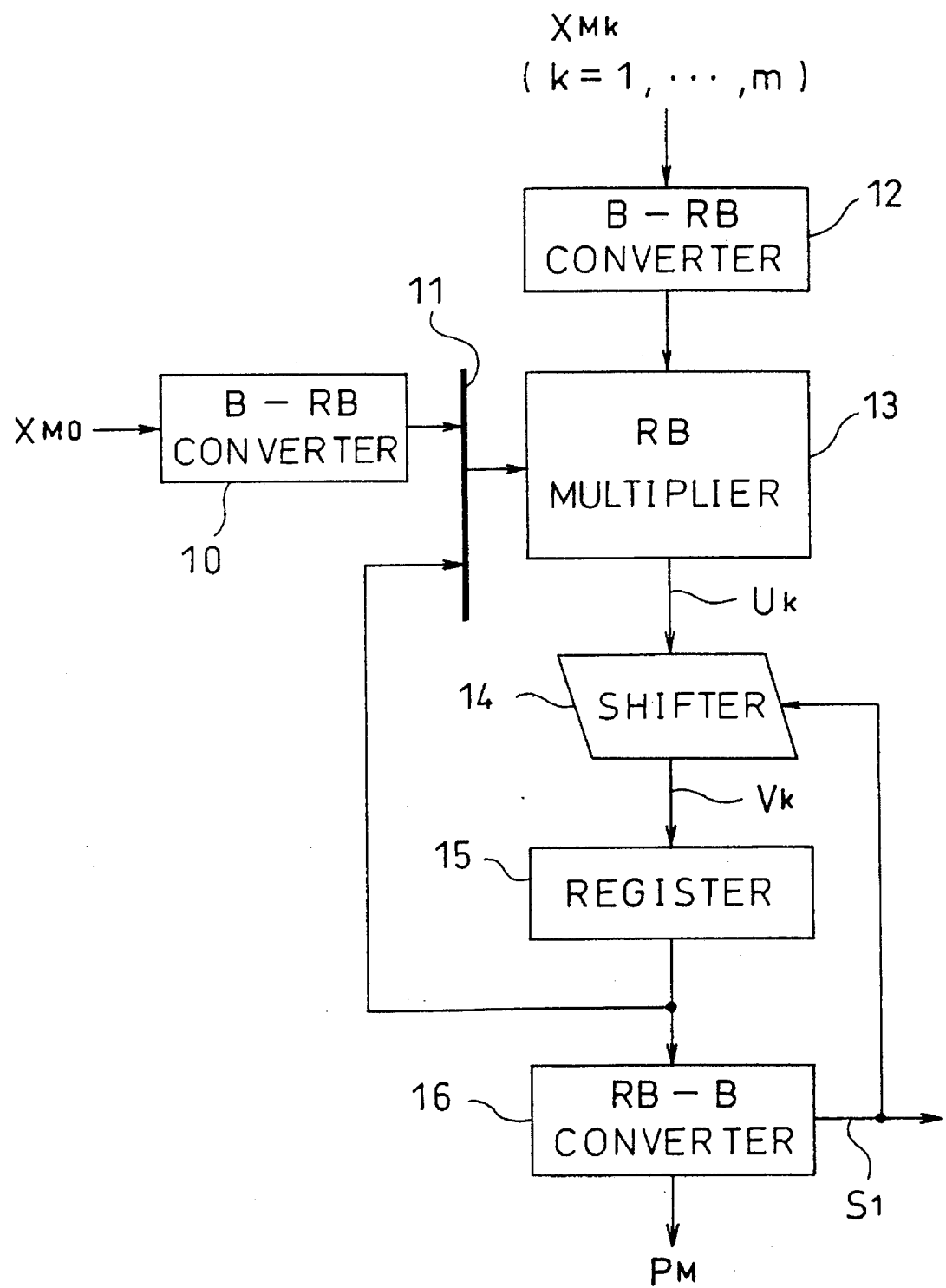
FIG. 1 is a block diagram illustrating the organization of a mantissa process section of a first embodiment of the present invention.
Figure 2:
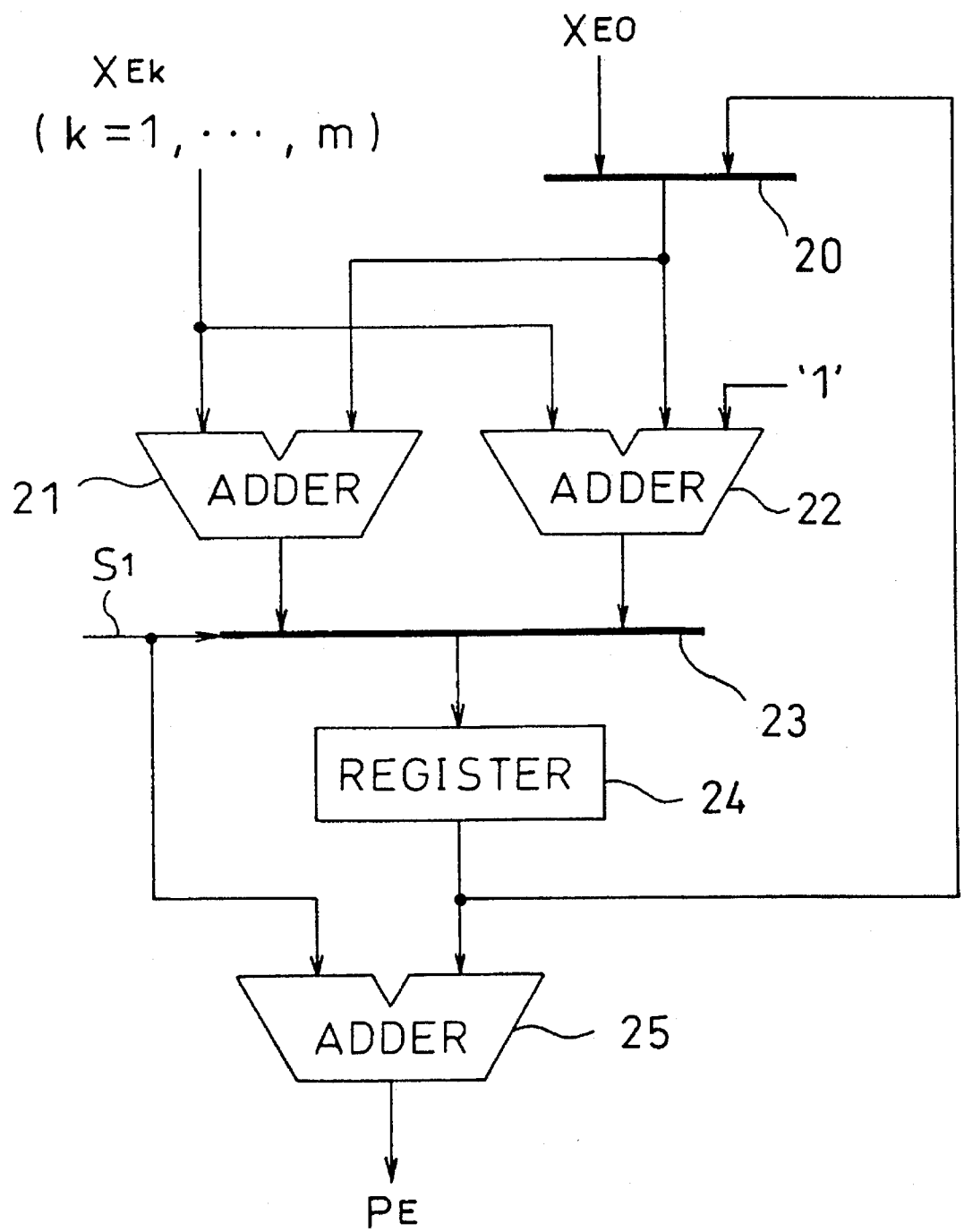
FIG. 2 is a block diagram illustrating the organization of an exponent process section of the first embodiment.

FIG. 1 diagrams a mantissa process section of a first iterative arithmetic processor for performing the arithmetic operation of normalized floating-point numbers, whereas FIG. 2 diagrams an exponent process section of the first iterative arithmetic processor.

The first iterative arithmetic processor is an apparatus for performing iterative multiplication operations, written as follows, m times:

$$P = X_0 \times X_1 \times X_2 \times \ldots \times X_m \quad (2)$$

Here, $X_k$ (i.e., the input data) (k=0, ..., m) and P (i.e., the arithmetic operation result) are normalized floating-point numbers. $X_{Mk}$ and $X_{Ek}$ (k=0, ..., m) are binary numbers, and $X_{Mk}$ represents the mantissa of $X_k$ whereas $X_{Ek}$ represents the exponent of $X_k$. $P_M$ and $P_E$ are binary numbers, and $P_M$ represents the mantissa of P whereas $P_E$ represents the exponent of P. $X_{Mk}$ (k=0, ..., m) satisfies $1 \leq X_{Mk} < 2$. $P_M$ is so adjusted that it satisfies $1 \leq P_M < 2$.

The mantissa process section of FIG. 1 comprises a first converter (hereinafter called the first B(inary)-RB converter) 10 for performing the conversion of an external binary number $X_{M0}$ into an RB number, a selector 11, a second converter (the second B-RB converter) 12 for sequentially performing the conversion of an external binary number $X_{Mk}$ (k=1, ..., m) into an RB number, a multiplier (the RB multiplier) 13 for performing the multiplication operation of two RB numbers to find a product represented in RB number representation, a shifter 14 for right-shifting an output $U_k$ of the RB multiplier 13 one place, a register 15 for holding an output $V_k$ of the shifter 14 represented in RB number representation, and a reverse converter (the RB-B converter) 16 for performing the conversion of an RB number into a binary number. Data, held in the register 15, is fed to one of two input ports on the selector 11 and to the RB-B converter 16. The selector 11 selects an RB number from the first B-RB converter 10 or an RB number from the register 15, thereby providing a selected RB number to one of two input ports on the RB multiplier 13. The second B-RB converter 12 provides an RB number to the other input port on the RB multiplier 13. The RB-B converter 16 not only performs the conversion of an RB number from the register 15 into a binary number but also outputs a shift-amount signal $S_1$ on the basis of a specific digit that is positioned upward two places from the binary point of the binary number obtained by such RB-to-B conversion. If the specific digit=0, then $S_1=0$. If the specific digit =1, then $S_1=1$. The shift-amount signal $S_1$ is fed to the shifter 14 as well as to the exponent process section of FIG. 2. If $S_1=0$, then the shifter 14 outputs the as-received $U_k$ as $V_k$. On the other hand, if $S_1=1$, the shifter 14 shifts $U_k$ to the right one place and outputs a result of such a right shift operation as $V_k$. The RB-B converter 16 also performs the function of finding $P_M$ by right-shifting a finally obtained mantissa for normalization and outputs, when performing such a right-shift operation, the shift-amount signal $S_1$.

The exponent process section of FIG. 2 comprises a first selector 20, a first 2-input adder 21, a 3-input adder 22, a second selector 23, a register 24, and a second 2-input adder 25. The first selector 20 selects between $X_{E0}$ and a binary number from the register 24, thereby providing a selected binary number to the first 2-input adder 21 as well as to the 3-input adder 22. $X_{Ek}$ (k=1, ..., m) is fed to the first 2-input adder 21 and to the 3-input adder 22. The first 2-input adder 21 performs the addition operation of two binary numbers. The 3-input adder 22 performs the addition operation of the same binary numbers as fed to the first 2-input adder 21 and 1. The second selector 23 selects between the first 2-input adder's 21 output and the 3-input adder's 22 output according to the shift-amount signal $S_1$ from the RB-B converter 16, thereby providing a selected output to the register 24. In other words, if $S_1=0$, then the second selector 23 selects the first 2-input adder's 21 output. If $S_1=1$, then the second selector 23 selects the 3-input adder's 22 output. The second 2-input adder 25 performs the addition operation of the shift-amount signal $S_1$ that is output from the RB-B converter 16 when a finally obtained mantissa is normalized and the register's 24 output, thereby finding $P_E$.

Figure 3:
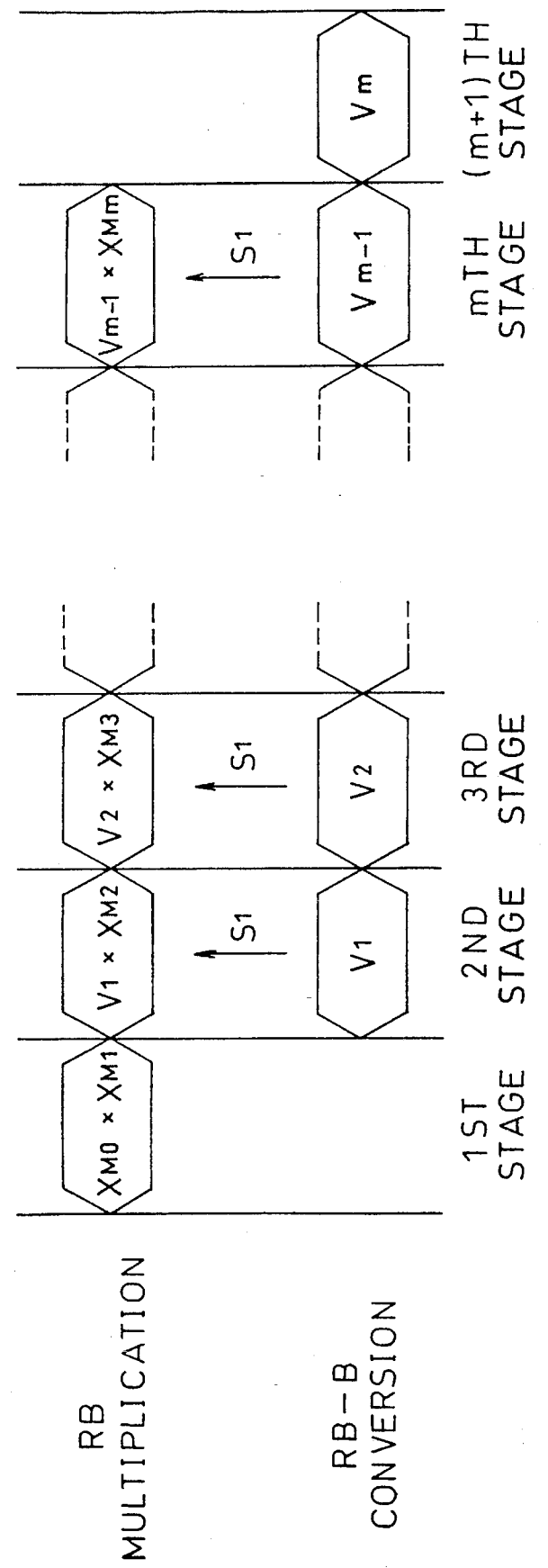
FIG. 3 is a timing chart showing the operation of the mantissa process section of FIG. 1.

How the mantissa process section of FIG. 1 works is explained. FIG. 3 is a timing chart illustrating the operation of the mantissa process section.

At stage 1, whereas the first B-RB converter 10 converts $X_{M0}$, received from the outside, into an RB number and provides the obtained RB number to the RB multiplier 13, the second B-RB converter 12 converts $X_{M1}$, received from the outside, into an RB number and provides the obtained RB number to the RB multiplier 13. Then, the RB multiplier 13 performs the multiplication operation of these two received RB numbers (i.e., $U_1 = X_{M0} \times X_{M1}$). Here, $1 \leq U_1 < 2^2$. Data, held by the register 15, has been reset to 0, so that the register 15 provides data of 0 to the RB-B converter 16 at stage 1. Therefore, $S_1=0$, and $V_1=U_1$. $V_1$ is stored in the register 15. Note that $1 \leq V_1 < 2^2$.

At stage 2, the RB multiplier 13 is fed $V_1$ from the register 15 and a result of the B-RB conversion with $X_{M2}$ by the second B-RB converter 12. Then, the RB multiplier 13 performs the multiplication operation of these two inputs (i.e., $U_2=V_1 \times X_{M2}$). Here, $1 \leq U_2 < 2^3$. More specifically, if $1 \leq V_1 < 2$, then $1 \leq U_2 < 2^2$, If $2 \leq V_1 < 2^2$, then $2 \leq U_2 < 2^3$. Meanwhile, the RB-B converter 16 performs the conversion of $V_1$ held by the register 15 into a binary number, thereby providing to the shifter 14 $S_1$ (i.e., the shift-amount signal) on the basis of a digit that is positioned upward two places from the binary point of the binary number obtained through such RB-B conversion. If $1 \leq V_1 < 2$, this sets the value of $S_1$ to 0. As a result, $U_2$ is not right-shifted by the shifter 14, and $V_2=U_2$. In such a case, since $1 \leq U_2 < 2^2$, $1 \leq V_2 < 2^2$. If $2 \leq V_1 < 2^2$, this sets the value of $S_1$ to 1. As a result the shifter 14 shifts $U_2$ to the right one place, a result of which is $V_2$. In this case, since $2 \leq U_2 < 2^3$, $1 \leq V_2 < 2^2$. This ensures that, in any case, $V_2$ that satisfies $1 \leq V_2 < 2^2$ is stored in the register 15.

At stage 3, $V_2 \times X_{M3}$ to find $U_3$ is performed concurrently with the conversion of $V_2$ into a binary number, and $V_3$ that the shifter 14 finds from $U_3$ is stored in the register 15. Here, $1 \leq U_3 < 2^3$ and $1 \leq V_3 < 2^2$. In this way, the operation proceeds up to stage m.

At stage m, $V_{m-1} \times X_{Mm}$ to find $U_m$ is performed concurrently with the conversion of $V_{m-1}$ into a binary number, and $V_m$ that the shifter 14 finds from $U_m$ is stored in the register 15. Here, $1 \leq U_m < 2^3$ and $1 \leq V_m < 2^2$.

At stage m+1, the RB-B converter 16 performs the conversion of $V_m$ into a binary number. If $1 \leq V_m < 2$, the RB-B converter 16 outputs the as-obtained result of the RB-B conversion with $V_m$ as $P_M$ and sets the value of $S_1$ to 0. If $2 \leq V_m < 2^2$ this causes the RB-B converter 16 to shift a result of the RB-B conversion with $V_m$ to the right one place, to output a result of such a right-shift operation as $P_M$, and to set the value of $S_1$ to 1. As a result, $1 \leq P_M < 2$.

According to the mantissa process section of FIG. 1, $1 \leq U_k < 2^3$ and $1 \leq V_k < 2^2$ at stage k (k=1, ..., m). Therefore, the number of digits making up data to be processed by the RB multiplier 13 and register 15 is independent of the arithmetic operation repeat count m; that is, such is fixed. Even if the arithmetic operation repeat count is great, the mantissa processing in the iterative multiplication operation (see Formula (2)) can be performed at high speed with less hardware.

Next, how the exponent process section of FIG. 2 works is described.

At stage 1, the first selector 20 selects $X_{E0}$. The first 2-input adder 21 performs the addition operation of $X_{E0}$ and $X_{E1}$. The 3-input adder 22 performs $X_{E0}+X_{E1}+1$. As described above, the value of $S_1$ is set to 1 at stage 1, so that the second selector 23 selects the first 2-input adder's 21 output. As a result, a sum of $X_{E0}+X_{E1}$ is stored in the register 24.

At stage 2, the first selector 20 selects the register's 24 output. The first 2-input adder 21 performs $(X_{E0}+X_{E1})+X_{E2}$. The 3-input adder 22 performs $(X_{E0}+X_{E1})+X_{E2}+1$. $S_1=0$ permits the second selector 23 to select the first 2-input adder's 21 output, whereas $S_1=1$ permits the second selector 23 to select the 3-input adder's 22 output. As a result, a sum of $X_{E0}+X_{E1}+X_{E2}$ is stored in the register 24 if there is performed no mantissa shift operation by one place to the right, whereas if there is performed a mantissa shift operation by one place to the right, this causes a sum of $X_{E0}+X_{E1}+X_{E2}+1$ to be stored in the register 24. In other words, the sum of the exponents is corrected depending upon the presence/absence of the mantissa shift operation. In this way, the operation proceeds up to stage m+1.

At stage m+1, the second 2-input adder 25 outputs $P_E$. Then, the second 2-input adder 25 performs the addition operation of the register's 24 output and the shift-amount signal $S_1$, the value of which is set to 0 or 1, from the RB-B converter 16, thereby providing a result of the addition operation as $P_E$.

As described above, in accordance with the exponent process section of FIG. 2, the sum of the exponents is continuously corrected depending upon the presence/absence of the mantissa shift operation at each stage in the mantissa process section. Additionally, at from stage 1 to stage m, it is possible for the adders 21 and 22 to start working without waiting for the supply of the shift-amount signal $S_1$.

Figure 4:
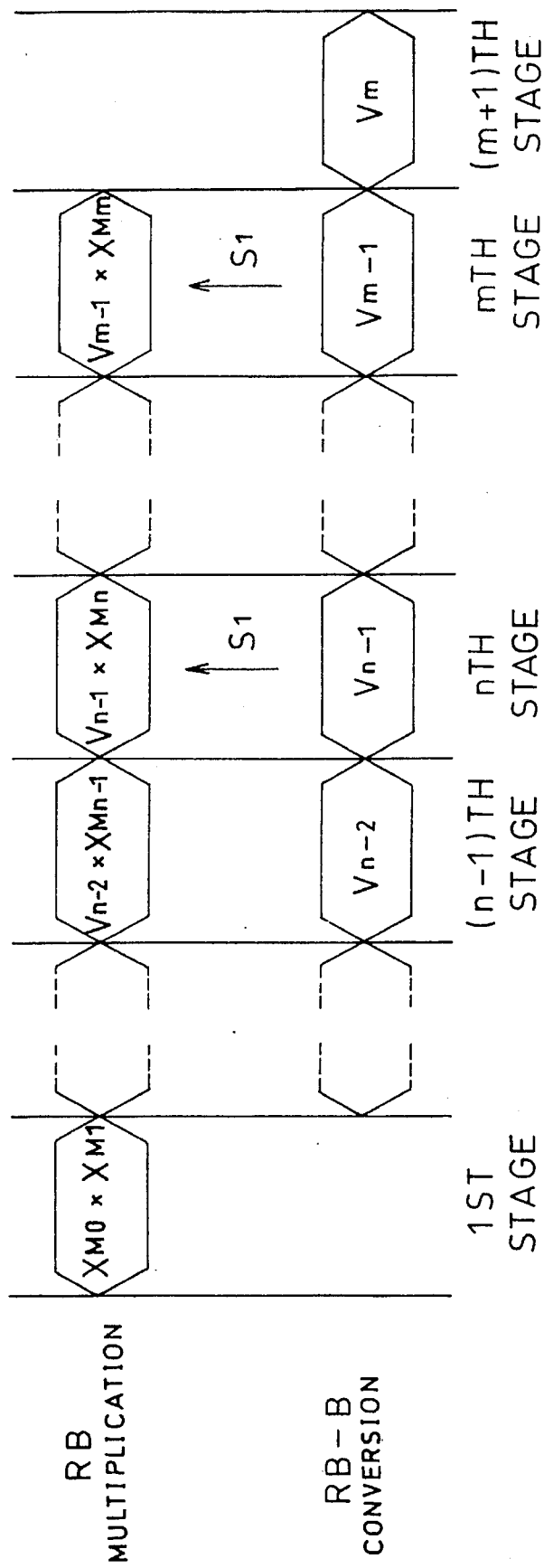
FIG. 4 is another timing chart showing the other operation of the mantissa process section of FIG. 1.

Additionally, in the mantissa process section of FIG. 1, the RB-B converter 16 may be so designed that it generates the shift-amount signal $S_1$ on the basis of a digit that is positioned upward n ($n \geq 3$) places from the binary point of a binary number obtained by its RB-B conversion. The timing of such operation is shown in FIG. 4. From stage 1 up to stage n-1, the value of $S_1$ is set to 0, and from stage n forward, the value of $S_1$ is set to 0 or 1. In this case, at stage k (k=1, ..., m), $1 \leq U_k < 2^{n+1}$ and $1 \leq V_k < 2^n$. Although the number of digits to be processed by the RB multiplier 13 and the register 15 increases with n, it does not increase with the arithmetic operation repeat count m. That is, even if the arithmetic operation repeat count m is great, the mantissa processing in the iterative multiplication operation (see Formula (2)) can be performed at high speed with involving less hardware. The amount of the right shift operation for normalization at stage m+1 increases with n. In other words, at stage m+1, it is possible for $S_1$ to be greater than or equal to 2 (i.e., $S_1 \geq 2$). FIG. 3 shows an example where n=2.

The above-described RB-B converter 16 is one that performs the conversion of data held by the register 15 into a binary number at each stage thereby providing the shift-amount signal $S_1$ on the basis of a single, specific digit that is positioned upward two places from the binary point of the binary number obtained by such RB-B conversion, to the shifter 14. The RB-B converter 16, however, may perform the RB-B conversion once every two stages and provide the shift-amount signal $S_1$ ($S_1=0$, 1, or 2) on the basis of specific digits that are respectively positioned upward two places and three places from the binary point of the obtained binary number. In this case, the operating frequency of the RB-B converter 16 drops, thereby reducing the power consumption. The size of hardware circuitry, however, increases.

Figure 5:
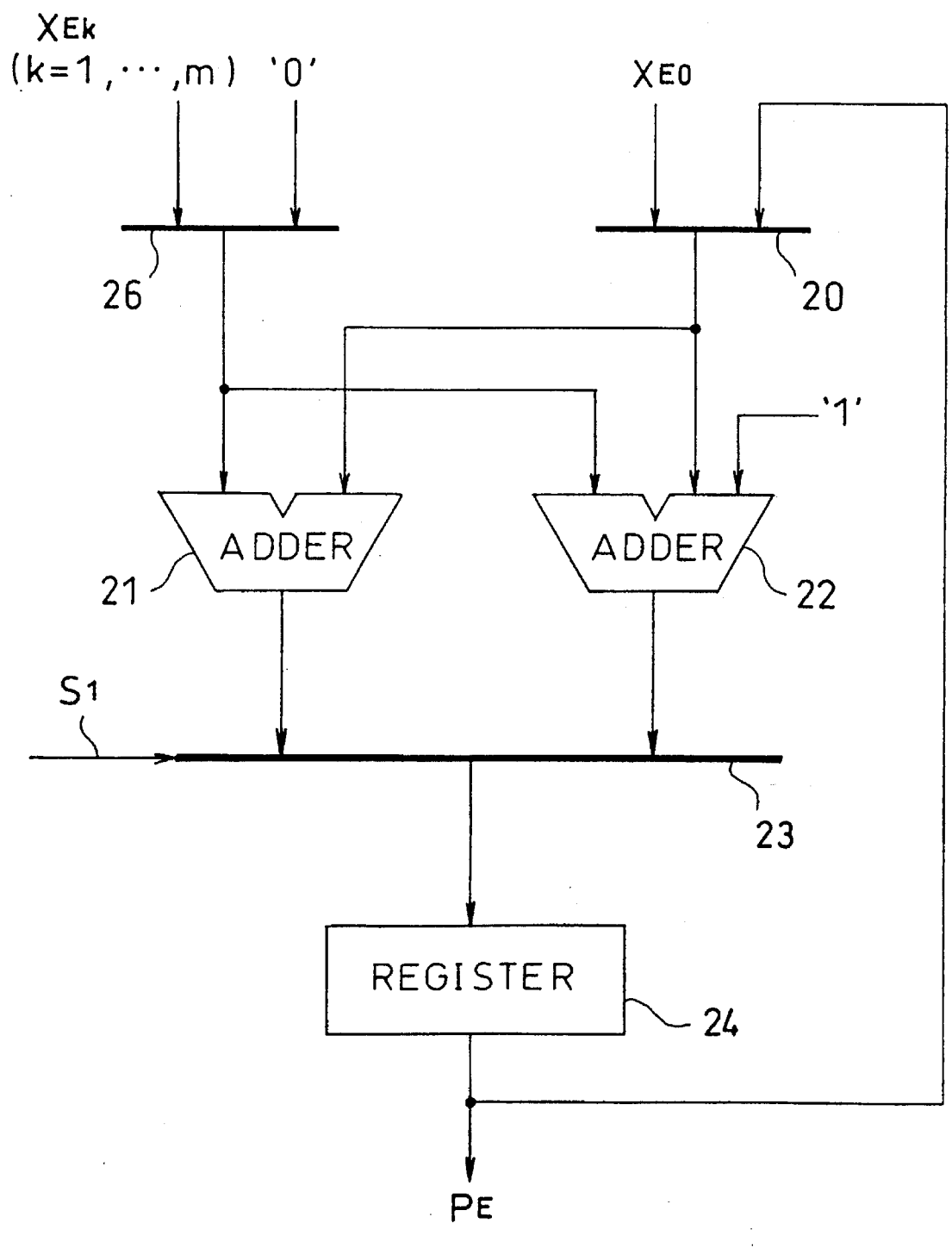
FIG. 5 is a block diagram showing a modification of the exponent process section of FIG. 2.

Modification examples of the exponent process section of FIG. 2 are described. FIG. 5 shows a modification of FIG. 2 without the second 2-input adder 25 but with a third selector 26. As a result, this modification is smaller in size compared with the one of FIG. 2. This modification finds applications in only such cases where n=2 where $S_1=0$ or 1. What is performed by the second 2-input adder 25 of FIG. 2 is done by the first 2-input adder 21, the 3-input adder 22, and the second selector 23. The third selector 26 selects a 0 at stage m+1.

Figure 6:
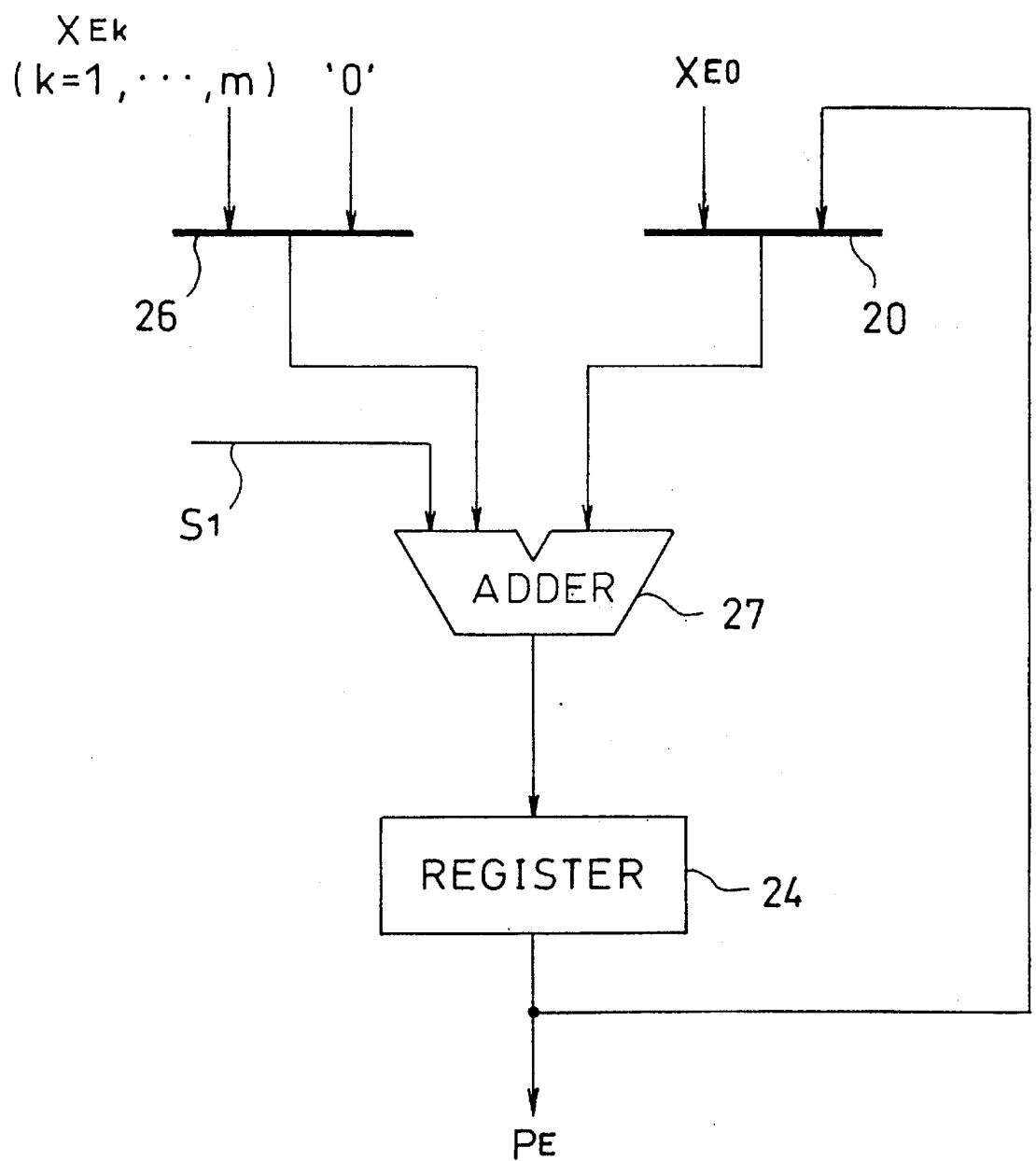
FIG. 6 is a block diagram showing another modification of the exponent process section of FIG. 2.

FIG. 6 shows a modification in which the first 2-input adder 21, the 3-input adder 22, and the second selector 27 of FIG. 5 are replaced by a single 3-input adder 27 so as to reduce the circuitry size. This 3-input adder 27 is fed the first selector's 20 output, the third selector's 26 output, and the shift-amount signal $S_1$.

EXAMPLE 2

Figure 7:
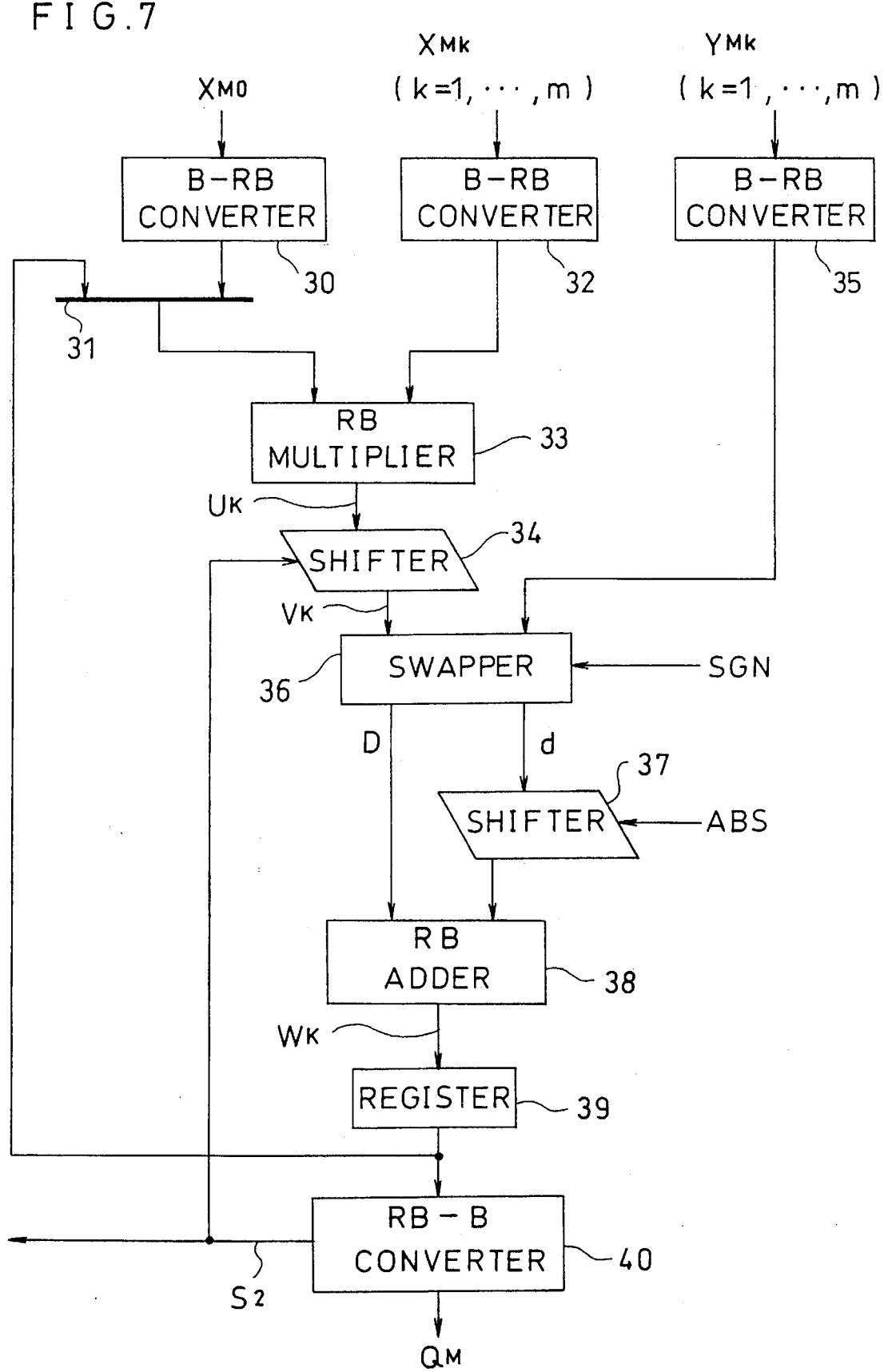
FIG. 7 is a block diagram illustrating the organization of a mantissa process section of a second embodiment of the present invention.
Figure 8:
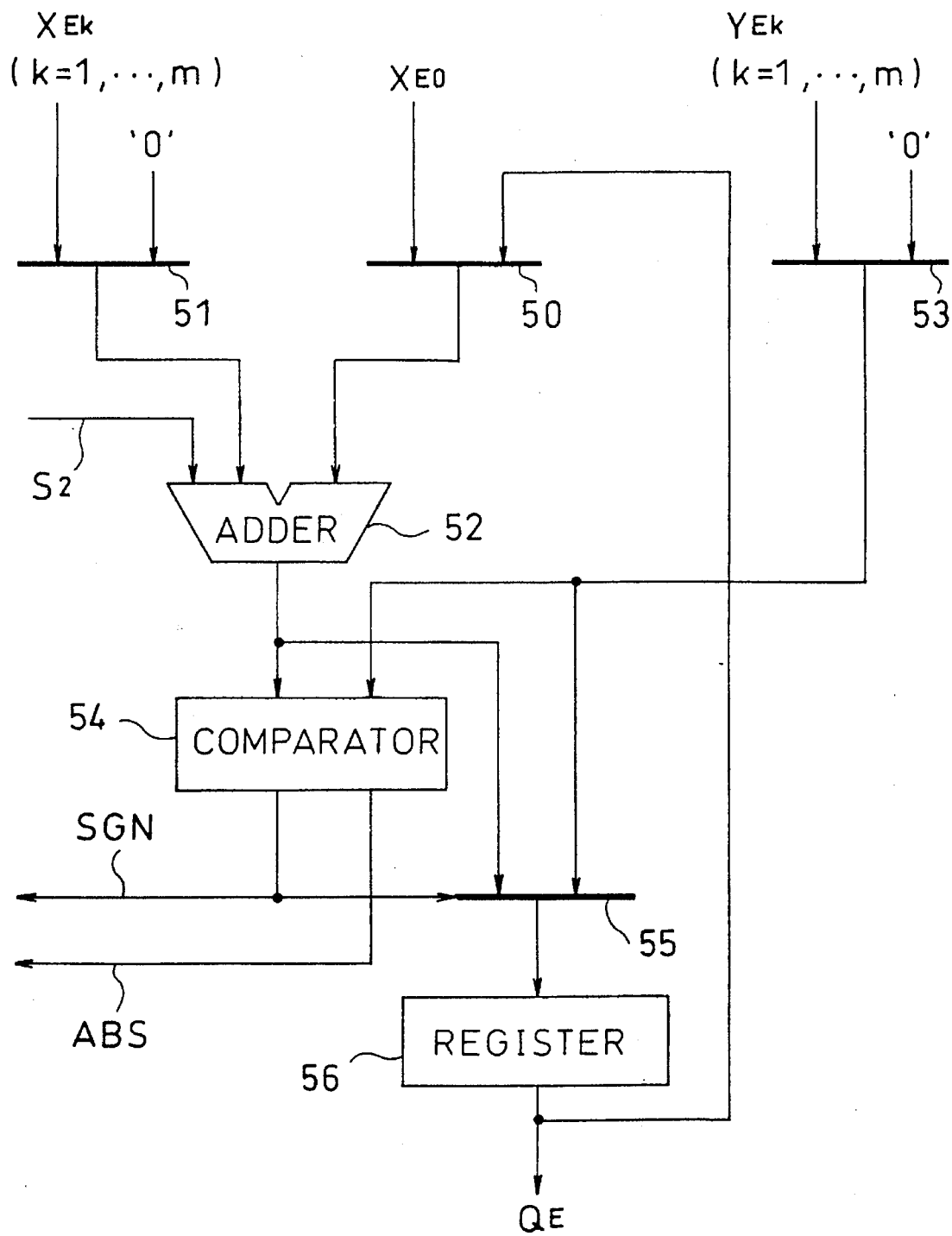
FIG. 8 is a block diagram illustrating the organization of an exponent process section of the second embodiment.

FIG. 7 diagrams a mantissa process section of a second iterative arithmetic processor for performing the arithmetic operation of normalized floating-point numbers, whereas FIG. 8 diagrams an exponent process section of the second iterative arithmetic processor.

The second iterative arithmetic processor is an apparatus for performing iterative arithmetic operations, written as follows, m times:

$$Q=(\ldots((X_0 \times X_1+Y_1) \times X_2+Y_2) \times \ldots) \times X_m+Y_m \qquad (3)$$

Here, $X_k$ (i.e., the input data) (k=0, ..., m), $Y_k$ (i.e. the input data) ((k=1, ..., m), and Q (i.e., the arithmetic operation result) are all normalized floating-point numbers. $X_{Mk}$ and $X_{Ek}$ (k=0, ..., m) are binary numbers, and $X_{Mk}$ represents the mantissa of $X_k$ whereas $X_{Ek}$ represents the exponent of $X_k$. $Y_{Mk}$ and $Y_{Ek}$ (k=1, ... m) are binary numbers, and $Y_{Mk}$ represents the mantissa of $Y_k$ whereas $Y_{Ek}$ represents the exponent of $Y_k$. $Q_M$ and $Q_E$ are binary numbers, and $Q_M$ represents the mantissa of Q whereas $Q_E$ represents the exponent of Q. $X_{Mk}$ (k=0, ..., m) satisfies $1 \leq X_{Mk} < 2$, and $Y_{Mk}$ (k=1, ..., m) satisfies $1 \leq Y_{Mk} < 2$. $Q_M$ is so adjusted that it satisfies $1 \leq Q_M < 2$.

The mantissa process section of FIG. 7 comprises a first B-RB converter 30 for performing the conversion of $X_{M0}$ into an RB number, a selector 31, a second B-RB converter 32 for sequentially performing the conversion of $X_{Mk}$ (k=1, ..., m) into an RB number, an RB multiplier 33, a first shifter 34 for right-shifting an output $U_k$ of the RB multiplier 33, a third B-RB converter 35 for sequentially performing the conversion of $Y_{Mk}$ (k=1, ..., m) into an RB number, a swapper 36 for performing the exchange of $V_k$ (i.e., an RB number from the first shifter 34) and a binary number from the third B-RB converter 35, a second shifter 37 for right-shifting the swapper's 36 output, an adder (hereinafter called the RB adder) 38 for performing the addition operation of two RB numbers to find a sum of them, a register 39 for holding $W_k$ (i.e., an RB number from the RB adder 38), and an RB-B converter 40.

Data, held in the register 39 and represented in RB number representation, is fed to one of two input ports of the selector 31 and to the RB-B converter 40. The selector 31 provides either an RB number from the first B-RB converter 30 or an RB number from the register 39 to one of two input ports of the RB multiplier 33. The second B-RB converter 32 provides an RB number to the other input port of the RB multiplier 33. $V_k$ (i.e., the first shifter's 34 output represented in RB number representation) is fed to one of two input ports of the swapper 36. The third B-RB converter 35 provides an RB number to the other input port of the swapper 36. The swapper 36 with two output ports D and d receives from the exponent process section of FIG. 8 a sign signal SGN carrying thereon swap information. If SGN=0, the swapper 36 provides $V_k$, received from the first shifter 34, to one of two input ports of the RB adder 38 at the output port D while at the same time providing an RB number, received from the third B-RB converter 35, to the second shifter 37 at the output port d. If SGN=1, on the other hand, the swapper 36 provides $V_k$, received from the first shifter 34, to the second shifter 37 at the output port d while at the same time providing an RB number, received from the third B-RB converter 35, to the foregoing input port of the RB adder 38 at the output port D. The second shifter 37 receives from the exponent process section of FIG. 8 an absolute value signal ABS carrying thereon shift-amount information. The second shifter 37 right-shifts an input RB number by a shift amount specified by ABS, thereby providing a result of the right-shift operation to the other input port of the RB adder 38.

The RB-B converter 40 not only performs the conversion of an RB number from the register 39 into a binary number but also outputs a shift-amount signal $S_2$ on the basis of two digits that are respectively positioned upward two and three places from the binary point of the binary number obtained by such RB-B conversion. If these two digits are 00, then $S_2=0$. If these two digits are 01, then $S_2=1$. If the higher of these two digits that is positioned upward three places from the binary point of the obtained binary number is 1, then $S_2=2$. The shift-amount signal $S_2$ is fed to the first shifter 34 and to the exponent process section of FIG. 8. The first shifter 34 right-shifts $U_k$ (i.e., the RB multiplier's 33 output) by a specific shift amount specified by the shift-amount signal $S_2$, thereby providing $V_k$ (i.e., the result of the right-shift operation) to tile swapper 36. The RB-B converter 40 also has a function of finding $Q_M$ by right-shifting a finally obtained mantissa for normalization and outputs, when performing such a right-shift operation, the shift-amount signal $S_2$.

The exponent process section of FIG. 8 comprises a first selector 50, a second selector 51, a 3-input adder 52, a third selector 53, a comparator 54, a fourth selector 55, and a register 56. The first selector 50 receives a binary number from the register 56 and $X_{E0}$ (i.e., an external binary number), thereby providing either one of the received binary numbers to the 3-input adder 52. The second selector 51 receives $X_{Ek}$ (i.e., an external binary number) and a 0, thereby providing either one of these two inputs to the 3-input adder 52. Then, the 3-input adder 52 performs the addition operation of a binary number from the first selector 50, a binary number from the second selector 51, and the shift-amount signal $S_2$ ($S_2=0$, 1, or 2), thereby providing a sum of them to one of two input ports of the comparator 54 and to one of two input ports of the fourth selector 55. The third selector 53 receives $Y_{Ek}$ (k=1, ..., m) from the outside and a 0, thereby providing either one of the received inputs to the other input port of the comparator 54 and to the other input port of the fourth selector 55. The comparator 54 performs the compare operation of a binary number A from the 3-input adder 52 and a binary number B from the third selector 53. If $A \geq B$, on the one hand, the comparator 54 sets the value of SGN to 0. If A<B, on the other hand, the value of SGN is set to 1. Such a generated sign signal SGN is fed to the mantissa process section of FIG. 7 and to the forth selector 55. Additionally, the comparator 54 provides |A−B| to the mantissa process section of FIG. 7 as the absolute value signal ABS. Depending upon the sign signal SGN from the comparator 54, the fourth selector 55 provides to the register 56 either one of the 3-input adder's 52 output and the third selector's 53 output. If SGN=0, then the 3-input adder's 52 output is selected. If SGN=1, then the third selector's 53 output is selected. $Q_E$ (i.e., the exponent output data) is output from the register 56.

The operations of the mantissa process section of FIG. 7 and the exponent process section of FIG. 8 are now concurrently described below.

The processing of the mantissa process section (see FIG. 7) at stage 1 is first described. The first B-RB converter 30 performs the conversion of $X_{M0}$ (i.e, a binary number) into an RB number, thereby providing the result of such B-RB conversion to the RB multiplier 33. The second B-RB converter 32 performs the conversion of $X_{M1}$ (i.e., a binary number) into an RB number, thereby providing the result of such B-RB conversion to the RB multiplier 33. The RB multiplier 33 performs multiplication operation (i.e., $U_1=X_{M0} \times X_{M1}$). Here, $1 \leq U_1 < 2^2$. Data, held by the register 39, has been reset to 0 so that the register 39 provides data of "0" to the RB-B converter 40 at stage 1. Therefore, the value of $S_1$ is always set to 0, which leads to $V_1=U_1$. $V_1$ is fed to one of the two input ports of the swapper 36. It is to be noted here that $1 \leq V_1 < 2^2$. The third B-RB converter 35 performs the conversion of $Y_{M1}$ (i.e., a binary number) into an RB number, thereby providing the result of such B-RB conversion to the other input port of the swapper 36. Next, the processing of the exponent process section (see FIG. 8) at stage 1 is explained. The first selector 50 selects $X_{E0}$. The second selector 51 selects $X_{E1}$. The third selector 53 selects $Y_{E1}$. Since $S_2=0$, the 3-input adder 52 outputs $X_{E0}+X_{E1}$. In order to determine the exponent to be used when performing the digit-position alignment addition operation of $V_1$ ($=X_{M0} \times X_1$) and $Y_{M1}$, the comparator 54 makes comparison between $X_{E0}+X_{E1}$ and $Y_{E1}$. If $X_{E0}+X_{E1}$ is found greater than or equal to $Y_{E1}$, the comparator 54 sets the value of SGN to 0. If $X_{E0}+X_{E1}$ is found less than $Y_{E1}$, then the comparator 54 sets the value of SGN to 1. Additionally, the comparator 54 provides $|X_{E0}+X_{E1}-Y_{E1}|$ to the mantissa process section as the absolute value signal ABS. The fourth selector 55 makes selection between two inputs according to the sign signal SGN from the comparator 54 in order that the greater of $X_{E0}+X_{E1}$ and $Y_{E1}$ is stored in the register 56. If SGN=0, the swapper 36 within the mantissa process section provides $V_1$ to the RB adder 38, and $Y_{M1}$ to the second shifter 37. If SGN=1, the swapper 36 provides $V_1$ to the second shifter 37, and $Y_{M1}$ to the RB adder 38. In other words, of two mantissas subjected to digit-position alignment addition operation, the swapper 36 outputs a mantissa with a greater exponent &t the output port D, and the remaining mantissa at the output port d. For the digit-position alignment of mantissas, the second shifter 37 right-shifts an RB number from the swapper 36 by a specific shift amount specified by the absolute value signal ABS and provides the result of such a right-shift operation to the RB adder 38. The RB adder 38 performs the addition operation of an RB number from the output port D of the swapper 36 and an RB number from the second shifter 37. $W_1$ (i.e., a sum found by the RB adder 38) is stored in the register 39. Here, it is to be noted that $1<W_1<2^3$.

The processing of the mantissa process section at stage 2 is described. $W_1$ from the register 39 and the result of the B-RB conversion with $X_{M2}$ by the second B-RB converter 32 are applied to the RB multiplier 33. Then, the RB multiplier 33 performs multiplication operation (i.e., $U_2=W_1 \times X_{M2}$). Here, $1<U_2<2^4$. More specifically, if $1<W_1<2$, then $1<U_2<2^2$. If $2<W_1<2^2$, then $2 \leq U_2<2^3$. If $2^2 \leq W_1<2^3$, then $2^2 \leq U_2<2^4$. The RB-B converter 40 converts $W_1$ held by the register 39 into a binary number, thereby providing to the first shifter 34 $S_2$ on the basis of two specific digits that are positioned upward two and three places from the binary point of the binary number obtained by such RB-B conversion. If $1<W_1<2$, then the value of $S_2$ is set to 0. As a result, the first shifter 34 performs no right-shift operations to $U_2$, and $V_2=U_2$. In this case, $1<U_2<2^2$, so that $1<V_2<2^2$. If $2 \leq W_1<2^2$, then $S_2=1$, whereby the first shifter 34 shifts $U_2$ to the right one place. The result of this right-shift operation is $V_2$. In this case, since $2^2 \leq U_2<2^3$, then $1 \leq V_2<2^2$. If $2^2 \leq W_1<2^3$, then $S_2=2$, whereby the first shifter 34 shifts $U_2$ to the right two places. The result is $V_2$. In this case, since $2^2 \leq U_2<2^4$, then $1 \leq V_2<2^2$. In other words, in any case, $V_2$ that satisfies $1 \leq V_2<2^2$ is provided to one input port of the swapper 36. Meanwhile, in the exponent process section, the first selector 50 selects the register's 56 output. The 3-input adder 52 performs the addition operation of the register's 56 output, $X_{E2}$ and $S_2$. If no mantissa right-shift operation is carried out, $X_{E2}$ is added to the register's 56 output. If a mantissa right-shift by one place is carried out, $X_{E2}+1$ is added to the register's 56 output. If a mantissa right-shift by two places is carried out, $X_{E2}+2$ is added to the register's 56 output. In other words, the sum of the exponents is corrected depending on the shift amount for the mantissa shift operation. Then, the greater of the 3-input adder's output 52 and $Y_{E2}$ is stored in the register 56. In the mantissa process section, the swapper 36, the second shifter 37, and the RB adder 38 perform the digit-position alignment addition operation of $V_2$ and $Y_{M2}$, the result of which (i.e., $W_2$) is stored in the register 39. Here, it is to be noted that $1<W_2<2^3$. In this way, the operation proceeds to stage m.

At stage m, $U_m=W_{m-1} \times X_{Mm}$ is performed concurrently with the conversion of $W_{m-1}$ into a binary number, and $V_m$ that the first shifter 34 finds from $U_m$ is fed to the swapper 36. Then, $W_m$ as a result of the digit-position alignment addition operation of $V_m$ and $Y_{Mm}$ is stored in the register 39. Here, $1<U_m<2^4$, $1 \leq V_m<2^2$, and $1 \leq W_m<2^3$.

At stage m+1, $W_m$ is converted by the RB-B converter 40 within the mantissa process section into a binary number. Additionally, the RB-B converter 40 outputs the as-converted result (i.e., a binary number obtained by such RB-B conversion on $W_m$) as $Q_M$ if $1<W_m<2$ and sets the value of $S_2$ to 0. If $2 \leq W_m<2^2$, the RB-B converter 40 right-shifts the result of the RB-B conversion on $W_m$ one place, outputs the result of the right-shift operation as $Q_M$, and sets the value of $S_2$ to 1. If $2^2 W_m<2^3$, the RB-B converter 40 right-shifts the result of the RB-B conversion on $W_m$ two places, outputs the result of the right-shift operation as $Q_M$, and sets the value of $S_2$ to 2. This results in $1 \leq Q_M<2$. Meanwhile, in the exponent process section, data, held by the register 56, is corrected depending on the shift-amount signal $S_2$ from the RB-B converter 40, and the result of the correction process is output as $Q_E$. At this stage, the first selector 51 and the third selector 53 each select a 0.

As described above, in accordance with the mantissa process section of FIG. 7, at stage k (k=1, . . . , m), $1 \leq U_k<2^4$, $1 \leq V_k<2^2$, and $1<W_k<2^3$. Therefore the number of digits to be processed by the RB multiplier 33, the RB adder 38, and the register 39 is independent of the arithmetic operation repeat count m, that is, such is fixed. Even if the arithmetic operation repeat count m is great, the processing of mantissas in the iterative arithmetic operation (see Formula (3)) can be performed at high speed with involving less hardware.

The RB-B converter 40 within the mantissa process section of FIG. 7 may be so designed that it generates the shift-amount signal $S_2$ based on two specific digits that are positioned upward n places and n+1 places from the binary point of a binary number obtained by its RB-B conversion (n is greater than or equal to 4). Additionally, the RB-B converter 40 may perform RB-B conversion once every two stages and provide the shift-amount signal $S_2$ ($S_2=0$, 1, 2, 3 or 4) on the basis of four specific digits that are positioned upward two places, three places, four places and five places from the binary point of a binary number obtained by its RB-B conversion. Further, the exponent process section of FIG. 8 may be modified to have a form corresponding to FIG. 2 or to FIG. 5.

EXAMPLE 3

Figure 9:
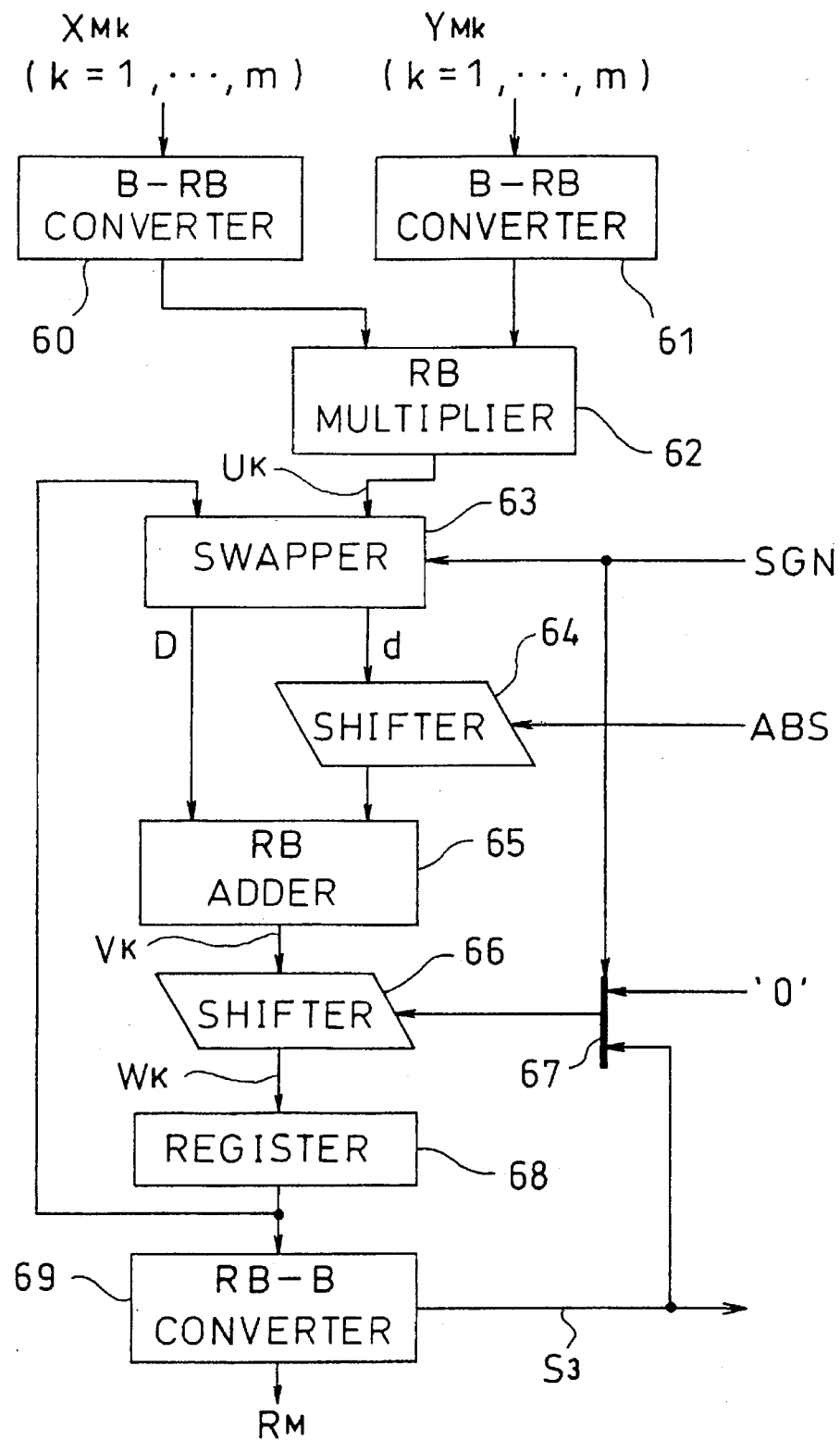
FIG. 9 is a block diagram illustrating the organization of a mantissa process section of a third embodiment of the present invention.
Figure 10:
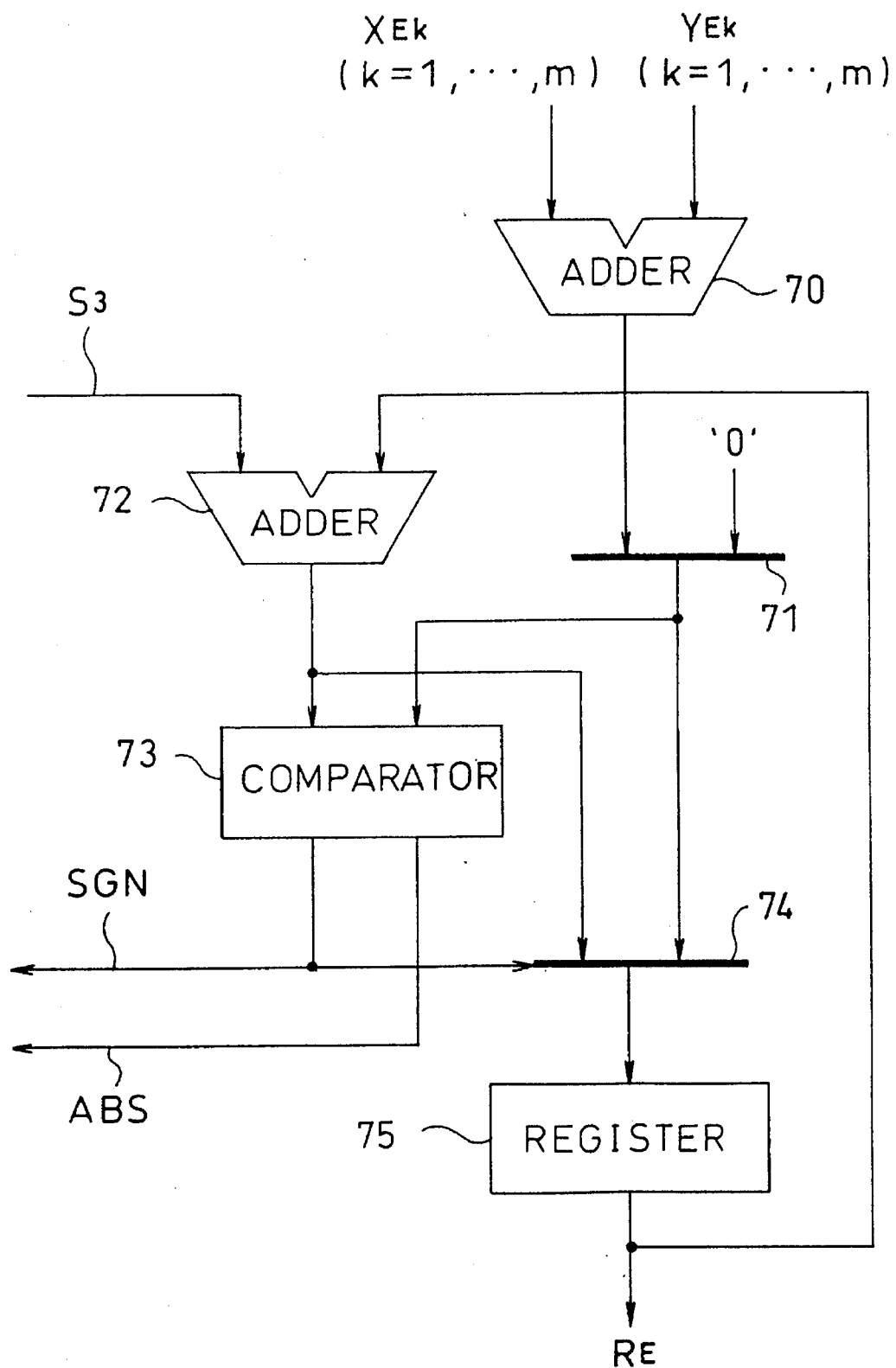
FIG. 10 is a block diagram illustrating the organization of an exponent process section of the third embodiment.

FIG. 9 diagrams a mantissa process section of a third iterative arithmetic processor for performing the arithmetic operation of normalized floating-point numbers, whereas FIG. 10 diagrams an exponent process section of the third iterative arithmetic processor.

The third iterative arithmetic processor is an apparatus for performing iterative arithmetic operations written as follows:

$$R = X_1 \times Y_1 + X_2 \times Y_2 + \ldots + X_m \times Y_m \quad (4)$$

Here, $X_k$ (i.e., the input data; k=1, ..., m), $Y_k$ (i.e. the input data; k=1, ... m), and R (i.e., the arithmetic operation result) are all normalized floating-point numbers. $X_{Mk}$ and $X_{Ek}$ (k=1, ..., m) are binary numbers, and $X_{Mk}$ represents the mantissa of $X_k$ whereas $X_{Ek}$ represents the exponent of $X_k$. $Y_{Mk}$ and $Y_{Ek}$ (k=1, ..., m) are binary numbers, and $Y_{Mk}$ represents the mantissa of $Y_k$ whereas $Y_{Ek}$ represents the exponent of $Y_k$. $R_M$ and $R_E$ are binary numbers, and $R_M$ represents the mantissa of R whereas $R_E$ represents the exponent of R. $X_{Mk}$ (k=1, ..., m) satisfies $1 \leq X_{Mk} < 2$, and $Y_{Mk}$ (k=1, ..., m) satisfies $1 \leq Y_{Mk} < 2$. $R_M$ is so adjusted that it satisfies $1 \leq R_M < 2$.

The mantissa process section, shown in FIG. 9, comprises a first B-RB converter 60 for sequentially performing the conversion of $X_{Mk}$ (k=1, ..., m) into an RB number, a second B-RB converter 61 for sequentially performing the conversion of $M_{Ek}$ (k=1, ..., m) into an RB number, an RB multiplier 62, a swapper 63 for performing the exchange of $U_k$ (i.e., the RB multiplier's 62 output) and another binary number, a first shifter 64 for right-shifting one of two outputs of the swapper 63, an RB adder 65, a second shifter 66 for shifting $V_k$ (i.e., the RB adder's 65 output) to the right one place, a selector 67, a register 68 for holding $W_k$ (i.e., an RB number from tile second shifter 66), and an RB-B converter 69. The first B-RB converter 60 provides an RB number to one of two input ports of the RB multiplier 62. The second B-RB converter 61 provides an RB number to the other input port of the RB multiplier 62. $U_k$ (i.e., the RB multiplier's 62 output) is fed to one of two input ports of the swapper 63, and the other input port of the swapper 63 is fed data held by the register 68. As in FIG. 7, the swapper 63, the first shifter 64 and the RB adder 65 together perform the digit-position alignment addition operation according to the sign signal SGN and the absolute value signal ABS from the exponent process section. The RB-B converter 69 not only performs the conversion of an RB number from the register 68 into a binary number but also outputs a shift-amount signal $S_3$ on the basis of a specific digit that is positioned upward three places from the binary point of the binary number obtained by such RB-B conversion. If the digit in question is 0, the RB-B converter 69 sets the value of $S_3$ to 0. If the digit in question is 1, the RB-B converter 69 sets the value of $S_3$ to 1. This shift-amount signal $S_3$ is fed to the second shifter 66 by way of the selector 67 as well as to the exponent process section of FIG. 10. If SGN=0, the selector 67 provides the shift-amount signal $S_3$ to the second shifter 66 as a required shift amount. If SGN=1, the selector 67 provides a value of 0 to the second shifter 66 as a required shift amount. The second shifter 66 outputs the as-received $V_k$ as $W_k$ if the shift amount specified by the selector 67 is 0. On the other hand, if the shift amount specified by the selector 67 is 1, the second shifter 66 shifts the received $V_k$ to the right one place and outputs the result of the right-shift operation as $W_k$. For the case where SGN=1, the register's 68 output is right-shifted by the first shifter 64. As a result of this, the second shifter 66 performs no right-shift operations at all in order to prevent $V_k$ from undergoing too much shift operation. The RB-B converter 69 also has a function of finding $R_M$ by right-shifting a finally obtained mantissa for normalization, and outputs, when performing such a right-shift operation, the shift-amount signal $S_3$.

The exponent process section of FIG. 10 comprises a first 2-input adder 70, a first selector 71, a second 2-input adder 72, a comparator 73, a second selector 74, and a register 75. The first 2-input adder 70 receives two different external binary numbers (i.e., $X_{Ek}$ and $Y_{Ek}$ (k=1, ..., m) and performs the addition operation of these received binary numbers. The second 2-input adder 72 receives a binary number from the register 75 and the shift-amount signal $S_3$ ($S_3$=0 or 1) from the mantissa process section, adds these two inputs, and provides a sum to one of two input ports of the comparator 73 and to one of two input ports of the second selector 74. The first selector 71 receives a binary number from the first 2-input adder 70 and a 0, thereby providing either one of these two inputs to the other input port of the comparator 73 and to the other input port of the second selector 74. The comparator 73 receives a binary number A from the second 2-input adder 72 and a binary number B from the first selector 71 and compares these two inputs. If $A \geq B$, then the comparator 73 sets the value of the sign signal SGN to 0 (i.e., SGN=0). If A<B, then the comparator 73 sets the value of SGN to 1 (i.e., SGN=1). The sign signal SGN thus generated is fed to the mantissa process section and to the second selector 74. The comparator 73 also provides |A−B| to the mantissa process section as the absolute value signal ABS. Depending upon the sign signal SGN from the comparator 73, the second selector 74 selects between the second 2-input adder's 72 output and the first selector's 71 output thereby providing a selected one to the register 75. If SGN=0, on the one hand, then the second 2-input adder's 72 output is selected by the second selector 74. If SGN=1, on the other hand, then the first selector's 71 output is selected by the second selector 74. $R_E$ (i.e., the exponent output data) is put out from the register 75.

The operations of the mantissa process section of FIG. 9 and the exponent process section of FIG. 10 are now concurrently described below.

First, the processing of the mantissa process section (see FIG. 9) at stage 1 is explained. The first B-RB converter 60 converts $X_{M1}$ (i.e., a binary number) into an RB number and provides the obtained RB number to the RB multiplier 62. The second B-RB converter 61 converts $Y_{M1}$ (i.e., a binary number) into an RB number and provides the obtained RB number to the RB multiplier 62. Having received these two RB numbers from the first and second B-RB converters 60 and 61, the RB multiplier 62 performs multiplication operation (i.e., $U_1 = X_{M1} \times Y_{M1}$). Here, $1 \leq U_1 < 2^2$. Data, held by the register 68, has been reset to 0, so that, at stage 1, the register 68 provides data of 0 to one input port of the swapper 63 and to the RB-B converter 69. Therefore, the value of $S_3$ must be 0. $U_1$ is fed from the RB multiplier 62 to the other input port of the swapper 63. The processing of the exponent process section (see FIG. 10) at stage 1 is explained. The first 2-input adder 70 performs the addition operation of $X_{E1}$ and $Y_{E1}$. The first selector 71 selects the first 2-input adder's 70 output (i.e., $X_{E1}+Y_{E1}$). Since data, held by the register 75, has been reset to 0, the register 75 provides data of 0 to one input port of the 2-input adder 72 at stage 1. Since $S_3$=0, this permits the second 2-input adder 72 to output a 0. The comparator 73 makes a comparison in magnitude between 0 and $X_{E1}+Y_{E1}$, sets the value of SGN to 1 and provides $|X_{E1}+Y_{E1}|$ to the mantissa process section as the absolute value signal ABS. $X_{E1}+Y_{E1}$ is stored in the register 75. Since SGN=1, the swapper 63 within the mantissa process section provides $U_1$ to the RB adder 65, and a 0 to the first shifter 64. This results in making the RB adder 65 perform the addition operation of $U_1$ and 0 to find a sum, $V_1$. $V_1$ is fed to the second shifter 66. Here, it is to be noted that $1 \leq V_1 < 2^2$ Since SGN=1, this makes the selector 67 select a 0. Therefore, $W_1 = V_1$. $W_1$ that is the second shifter's 66 output is stored in the register 68. Here, $1 \leq W_1 < 2^2$.

At stage 2, the RB multiplier 62 performs the multiplication operation of $X_{M2}$ and $Y_{M2}$ to find a product, $U_2$ (i.e, $U_2 = X_{M2} \times Y_{M2}$). Here, $1 \leq U_2 < 2^2$. The register 68 provides $W_1$ to the swapper 63. The RB multiplier 62 provides $U_2$ to the swapper 63. The RB-B converter 69 performs the conversion of $W_1$, held by the register 68, into a binary number, thereby providing the shift-amount signal $S_3$ on the basis of a digit that is positioned upward three places from the binary point of the binary number obtained by such RB-B conversion. In this case, $1 \leq W_1 < 2^2$, this sets the value of $S_3$ to 0. Meanwhile, in the exponent process section, the first 2-input adder 70 performs $X_{E2}+Y_{E2}$. The first selector 71 selects the first 2-input adder's 70 output (i.e., $X_{E2}+Y_{E2}$). The second 2-input adder 72 performs the addition operation of $X_{E1}+Y_{E1}$ and the shift-amount signal $S_3$ (=0), thereby providing $X_{E1}+Y_{E1}$. If $X_{E1}+Y_{E1} \geq X_{E2}30\ Y_{E2}$, the comparator 73 sets the value of SGN to 0 (i.e., SGN=0). If $X_{E1}+Y_{E1} < X_{E2}+Y_{E2}$, the comparator 73 sets the value of SGN to 1 (i.e., SGN=1). In addition to this, the comparator 73 provides $|(X_{E1}+Y_{E1})-(X_{E2}+Y_{E2})|$ to the mantissa process section as the absolute value signal ABS. According to the sign signal SGN from the comparator 73, the second selector 74 makes selection in magnitude between a sum of $X_{E1}+Y_{E1}$ and a sum of $X_{E2}+Y_{E2}$ in order that the register 75 can stores $X_{E1}+Y_{E1}$ or $_{E2}+Y_{E2}$, whichever is greater. If SGN=0, this makes the swapper 63 of the mantissa process section provide $W_1$ to the RB adder 65, and $U_2$ to the first shifter 64. If SGN=1, this makes the swapper 63 provide $W_1$ to the first shifter 64, and $U_2$ to the RB adder 65. For the digit-position alignment of mantissas, the first shifter 64 right-shifts an RB number from the swapper 63 by a specific shift amount specified by the absolute value signal ABS and provides a result of the right-shift operation to the RB adder 65. The RB adder 65 performs the addition operation of an RB number from the output port D on the swapper 63 and an RB number from the first shifter 64 to find a sum, $V_2$. $V_2$ is fed to the second shifter 66. Although either $W_1$ or $U_2$ has been right-shifted by the first shifter 64, $1 < V_2 < 2^3$. Since $S_3=0$, the amount of the shift operation by the second shifter 66 is specified to 0 by the selector 67, regardless of the sign signal SGN. Therefore, $W_2=V_2$. $W_2$ (i.e., the second shifter's 66 output) is stored in the register 68. Here, $1 < W_2 < 2^3$.

In the mantissa process section at stage 3, the RB-B multiplier 62 performs the multiplication operation of $X_{M3}$ and $Y_{M3}$ to find a product, $U_3$. Note that $1 \leq U_3 < 2^2$. The register 68 provides $W_2$ to the swapper 63. The RB multiplier 62 provides $U_3$ to the swapper 63. The RB-B converter 69 converts $W_2$, held by the register 68, into a binary number, thereby providing the shift-amount signal $S_3$ on the basis of a digit that is positioned upward three places from the binary point of the binary number obtained by such RB-B conversion. If $1 < W_2 < 2^2$, then $S_3=0$. If $2^2 \leq W_2 < 2^3$, then the value of $S_3$ is set to 1. Meanwhile, in the exponent process section, the first 2-input adder 70 performs $X_{E3}+Y_{E3}$. Either data held by the register 75 or $X_{E3}+Y_{E3}$, whichever is greater, is stored in the register 75. The comparator 73 provides SGN and ABS to the mantissa process section. The swapper 63, the first shifter 64, and the RB adder 65 perform the digit-position alignment addition operation of $W_2$ and $U_3$ to find a sum, $V_3$. $V_3$ is supplied to the second shifter 66. If SGN=0, $U_3$ is right-shifted by the first shifter 64. Further, if $1 < W_2 < 2^2$, then $1 < V_3 < 2^3$. If $2^2 \leq W_2 < 2^3$, then $2^2 < V_3 < 2^4$. For the case where SGN=0, the RB-B converter 69 provides the shift-amount signal $S_3$ (=0 or 1) to the second shifter 66. Therefore, if $1 < W_2 < 2^2$, no shift operations by one place to the right are performed by the second shifter 66. This results in $W_3=V_3$. In this case, since $1 < V_3 < 2^3$, $1 < W_3 < 2^3$. If $2^2 \leq W_2 < 2^3$, this causes the second shifter 66 to shift $V_3$ to the right one place, the result of which is $W_3$. Since $2^2 < V_3 < 2^4$, $2 < W_3 < 2^3$. If SGN=1, this causes the first shifter 64 to right-shift $W_2$. As a result, $1 < V_3 < 2^3$. In this case, the selector 67 selects a 0, so that the second shifter 66 performs no shift operations by one place to the right. As a result, $W_3=V_3$, and thus $1 < W_3 < 2^3$. In other words, in any case, $W_3$ that satisfies $1 < W_3 < 2^3$ is stored in the register 68. In this way, the operation proceeds up to stage m.

At stage m, the multiplication of $X_{Mm} \times Y_{Mm}$ to find a product, $U_m$ is carried out concurrently with the conversion of $W_{m-1}$ into a binary number. $W_{m-1}$ and $U_m$ are subjected to a digit-position alignment addition operation in order to find $V_m$, and $W_m$ as a result of shifting $V_m$ is stored in the register 68. Here, $1 \leq U_m < 2^2$, $1 < V_m < 2^4$, and $1 < W_m < 2^3$.

At stage m+1, the RB-B converter 69 in the mantissa process section converts $W_m$ into a binary number. If $1 < W_m < 2$, the RB-B converter 69 outputs the as-converted result obtained by such RB-B conversion on $W_m$ as $R_M$ and sets the value of $S_3$ to 0. If $2 \leq W_m < 2^2$, the RB-B converter 69 shifts such a conversion result to the right one place, outputs the result of the right-shift operation as $R_M$, and sets the value of $S_3$ to 1. If $2^2 \leq W_m < 2^3$, the RB-B converter 69 shifts the conversion result to the right two places, outputs the result of the right-shift operation as $R_M$, and sets the value of $S_3$ to 2. As a result, $1 \leq R_M < 2$. Meanwhile, in the exponent process section, based on the shift-amount signal $S_3$ from the RB-B converter 69, data, held by the register 75, is corrected, and the result of the correction operation is output as $R_E$. At this stage, the first selector 71 selects a 0.

As described above, in accordance with the mantissa process section of FIG. 9, at stage k (k=1, ..., m), $1 \leq U_k < 2^2$, $1 \leq V_k < 2^4$, and $1 \leq W_k < 2^3$. Therefore, the number of digits to be processed by the RB adder 65 and the register 68 is independent of the arithmetic operation repeat count m, that is, such is fixed. Even if the arithmetic operation repeat count m is great, the processing of mantissas in the iterative arithmetic operation (see Formula (4)) can be performed at a high speed with involving less hardware.

The RB-B converter 69 within the mantissa process section of FIG. 9 may be so designed that it generates the shift-amount signal $S_3$ on the basis of a specific digit that is positioned upward n places (n≥4) from the binary point of a binary number obtained by its RB-B conversion. Additionally, the RB-B converter 69 may perform the RB-B conversion of data held by the register 68 to a binary number once every two stages and provide the shift-amount signal $S_3$ ($S_3$=0, 1, or 2) on the basis of two specific digits that are positioned upward three places and four places from the binary point of a binary number obtained by its RB-B conversion. Further, the exponent process section of FIG. 10 may be modified to have a form corresponding to FIG. 2 or to FIG. 5.

EXAMPLE 4

Figure 11:
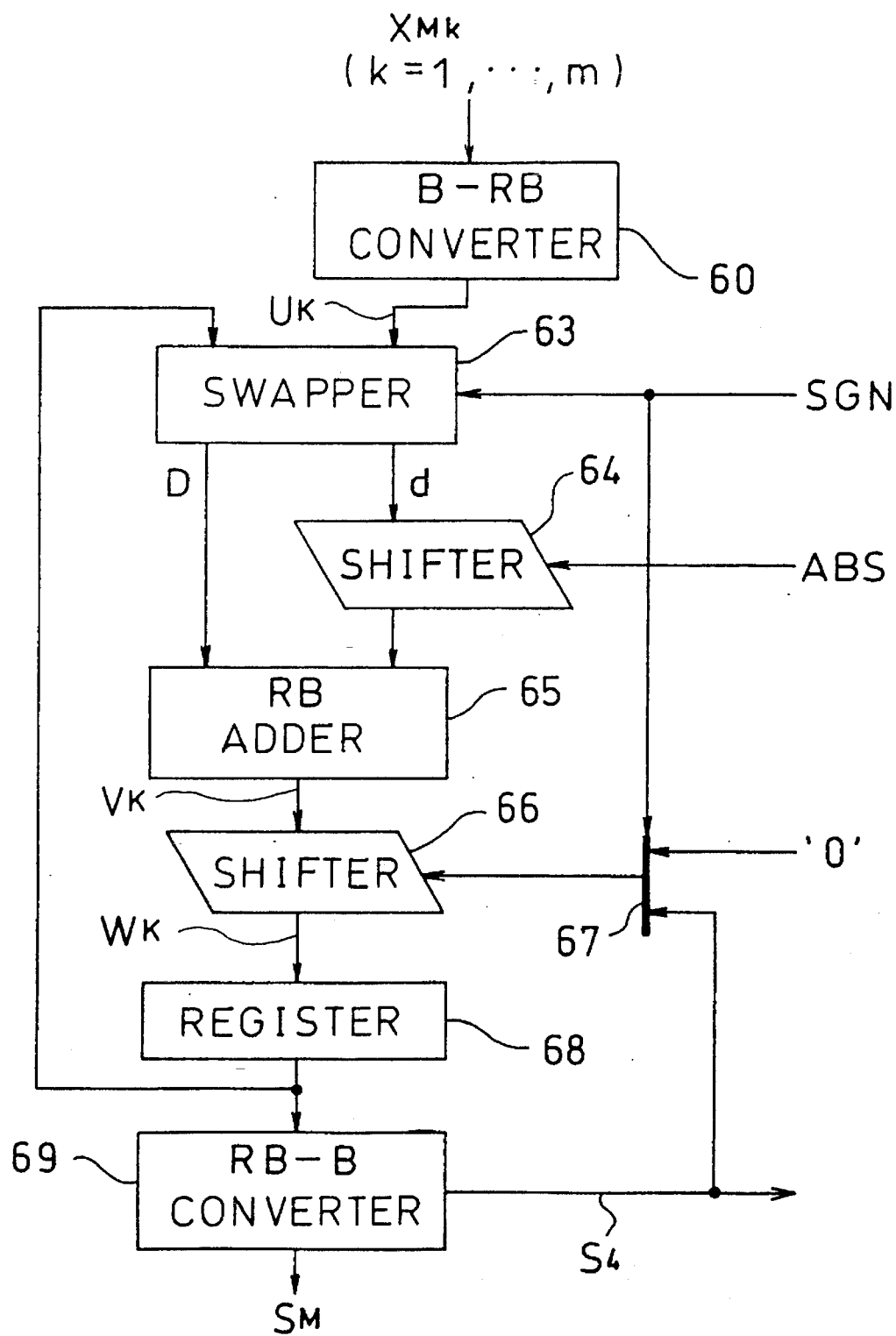
FIG. 11 is a block diagram illustrating the organization of a mantissa process section of a fourth embodiment of the present invention.

FIG. 11 diagrams a mantissa process section of a fourth iterative arithmetic processor for performing the arithmetic operation of normalized floating-point numbers, whereas FIG. 12 diagrams an exponent process section of the fourth iterative arithmetic processor.

The fourth iterative arithmetic processor is an apparatus for performing iterative addition operations written as follows:

$$S = X_1 + X_2 + \ldots + X_m \qquad (5)$$

Here, both $X_k$ (i.e., the input data; k=1, ..., m) and S (i.e., the arithmetic operation result) are normalized floating-point numbers. $X_{Mk}$ and $X_{Ek}$ (k=1, ..., m) are binary numbers, and $X_{Mk}$ represents the mantissa of $X_k$ whereas $X_{Ek}$ represents the exponent of $X_k$. $S_M$ and $S_E$ are binary numbers, and $S_M$ represents the mantissa of S whereas $S_E$ represents the exponent of S. $X_{Mk}$ (k=1, ..., m) satisfies $1 \leq X_{Mk} < 2$, and $S_M$ is so adjusted that it satisfies $1 \leq S_M < 2$.

The mantissa process section of FIG. 11 is identical in configuration with the mantissa process section of FIG. 9; however, the former is provided with neither the second B-RB converter 61 nor the RB multiplier 62. In the mantissa process section of FIG. 11, $U_k$ (i.e., the B-RB converter's 60 output) is fed directly to one input port of the swapper 63. The RB-B converter 69 of tile present embodiment is characterized in that it converts an RB number into a binary number and outputs a shift-amount signal $S_4$ on the basis of a specific digit that is positioned upward two places from the binary point of the obtained binary number. If the specific digit is 0, this sets the value of $S_4$ to 0. If the specific digit is 1, this sets the value of $S_4$ to 1.

The exponent process section of FIG. 12 is identical in configuration with the exponent process section of FIG. 10; however, the former is not provided with the first 2-input adder 70. In accordance with the exponent process section of the present embodiment, $X_{Ek}$ (k=1, ..., m) is fed directly to one input port of the first selector 71.

According to the mantissa process section of FIG. 11, $S_4=0$ at stages 1 and 2, and, from stage 3 forward, $S_4=0$ or 1. As seen from the description of the third embodiment, $U_k$ (i.e., one of the inputs of the swapper 63), $V_k$ (i.e., the RB adder's 65 output), and $W_k$ (i.e., the second shifter's 66 output) respectively satisfy $1 \leq U_k < 2$, $1 \leq V_k < 2^3$, and $1 \leq W_k < 2^2$. Therefore, the number of digits to be processed by the RB adder 65 and the register 68 is independent of the arithmetic operation repeat count m, that is, such is fixed. Even if the arithmetic operation repeat count m is great, the processing of mantissas in the iterative addition operation (see Formula (5)) can be performed at a high speed with involving less hardware.

The RB-B converter 69 within the mantissa process section of FIG. 11 may be so designed that it generates the shift-amount signal $S_4$ based on a specific digit that is positioned upward n places (n≥3) from the binary point of a binary number obtained by its RB-B conversion. Additionally, the RB-B converter 69 may perform the RB-B conversion of data held by the register,68 into a binary number once every two stages and provide the shift-amount signal $S_4$ ($S_4=0$, 1, or 2) on the basis of two specific digits that are positioned upward two places and three places from the binary point of a binary number obtained by its RB-B conversion. Further, the exponent process section of FIG. 12 may be modified to have a form corresponding to FIG. 2 or to FIG. 5.

The invention claimed is:

1. An iterative arithmetic processor comprising:

first means with two input ports for performing an arithmetic operation of signed digit (SD) numbers supplied at said two input ports so as to find a result thereof represented in SD number representation;

second means for receiving at least one binary number made up of a plurality of digits including a non zero-value digit that is positioned upward one place from a binary point of said received binary number, and providing an SD number obtained from said received binary number to one of said two input ports of said first means;

third means for holding an SD number obtained by performing at least a right-shift operation to shift an arithmetic result found by said first means to the right by a specific shift amount, and providing said held SD number to the other of said two input ports of said first means; and fourth means for performing a conversion of an SD number held by said third means into a binary number, and providing to said third means a shift amount that is determined on the basis of a specific digit that is positioned upward two or more places from a binary point of said binary number obtained by said SD-to-binary conversion, as a specific shift amount for the right-shift operation by said third means.

2. An iterative arithmetic processor as in claim 1, wherein said first means has a multiplier that performs a multiplication operation of two input SD numbers so as to find a product thereof represented in SD number representation.

3. An iterative arithmetic processor as in claim 1, wherein said first means has an adder that performs an addition operation of two input SD numbers so as to find a sum thereof represented in SD number representation.

4. An iterative arithmetic processor as in claim 1, wherein said second means has a converter that performs a conversion of an input binary number into an SD number, and providing said SD number obtained by said binary-to-SD conversion to one of said two input ports of said first means.

5. An iterative arithmetic processor as in claim 1, wherein said second means has:

an arithmetic unit with two input ports for performing an arithmetic operation of SD numbers supplied at said two input ports so as to find a result thereof represented in SD number representation, and providing said result to one of said two input ports of said first means; and two converters for receiving respective binary numbers, each of said received binary numbers being made up of a plurality of digits including a non zero-value digit that is positioned upward one place from each binary point of said received binary numbers, performing a conversion of said received binary numbers into SD numbers, and providing said SD numbers obtained by said binary-to-SD conversion to said two input ports of said arithmetic unit, respectively.

6. An iterative arithmetic processor as in claim 1, wherein said third means has:

a shifter for performing a right-shift operation to shift an arithmetic result found by said first means to the right by a specific shift amount, and providing an SD number obtained by said right-shift operation; and a register for holding an SD number from said shifter, and providing said held SD number to the other of said two input ports of said first means.

7. An iterative arithmetic processor as in claim 1, wherein said third means has:

an arithmetic unit with two input ports for performing an arithmetic operation of SD numbers supplied at said two input ports so as to find a result thereof represented in SD number representation;

a shifter for performing a right-shift operation to shift an arithmetic result found by said first means to the right by a specific shift amount, and providing an SD number obtained by said right-shift operation to one of said input ports of said arithmetic unit;

a converter for receiving a binary number made up of a plurality of digits including a non zero-value digit that is positioned upward one place from a binary point of said received binary number, performing a conversion of said received binary number into an SD number, and providing said SD number obtained by said binary-to-SD conversion to the other of said two input ports of said arithmetic unit; and a register for holding an SD number indicative of an arithmetic result found by said arithmetic unit, and providing said held SD number to the other of said two input ports of said first means.

8. An iterative arithmetic processor as in claim 1, wherein said fourth means performs the function of determining the amount of right-shift operation by said third means on the basis of a single, specific digit that is positioned upward two or more places from the binary point of said binary number obtained by said SD-to-binary conversion.

9. An iterative arithmetic processor as in claim 1, wherein said fourth means performs the function of determining the amount of right-shift operation by said third means on the basis of a series of specific digits that are positioned upward two and more places from the binary point of said binary number obtained by said SD-to-binary conversion.

10. An iterative arithmetic method comprising the steps of:

storing in a register a singed digit (SD) number equivalent to a binary number made up of a plurality of digits including a non zero-value digit that is positioned upward of a binary point of said binary number;

performing a conversion of a binary number made up of a plurality of digits including a non zero-value digit that is positioned upward one place from a binary point of said binary number into an SD number;

performing an arithmetic operation of an SD number stored in said register and an SD number obtained by said binary-to-SD conversion so as to find a result thereof represented in SD number representation;

performing a conversion of an SD number stored in said register into a binary number;

right-shifting an arithmetic result found by said arithmetic operation step by a shift amount that is determined on the basis of a specific digit that is positioned upward two or more places from a binary point of a binary number obtained by said SD-to-binary conversion; and storing in said register an SD number obtained by said right-shift operation.

11. An iterative arithmetic processor comprising:

a multiplier with a first and a second input port for receiving two redundant binary (RB) numbers supplied at said first and second input ports respectively, and performing a multiplication operation of said two received RB numbers so as to find a product thereof represented in RB number representation;

a converter for receiving, as a mantissa of a normalized floating-point number X, a binary number made up of a plurality of digits including a non zero-value digit that is positioned upward one place from a binary point of said received binary number, performing a conversion of said received binary number into an RB number, and providing said RB number obtained by said binary-to-RB conversion to said first input port of said multiplier;

a shifter for right-shifting a product found by said multiplier by a specific shift amount, and providing an RB number obtained by said right-shift operation;

a mantissa register for holding an RB number from said shifter, and providing said held RB number to said second input port of said multiplier; and a reverse converter for performing a conversion of an RB number held in said mantissa register into a binary number, and providing to said shifter a shift amount that is determined on the basis of a specific digit that is positioned upward two or more places from a binary point of said binary number obtained by said RB-to-binary conversion, as a specific shift amount for the right-shift operation by said shifter.

12. An iterative arithmetic processor as in claim 11, wherein said reverse converter performs the function of determining the amount of right-shift operation by said shifter on the basis of a specific digit that is positioned upward two places from a binary point of a binary number obtained by said RB-to-binary conversion.

13. An iterative arithmetic processor as in claim 11 further including:

exponent finding means with a third and a fourth input port for receiving a binary number that serves as an exponent of said normalized floating-point number X at said third input port, receiving another binary number at said fourth input port, performing an addition operation of said two received binary numbers so as to find a sum thereof represented in binary representation, and making an adjustment to said sum depending on the amount of right-shift operation by said shifter so as to find a binary-coded, adjusted exponent; and an exponent register for holding a binary number indicative of said adjusted exponent, and providing said binary number to said fourth input port.

14. An iterative arithmetic processor comprising:

a multiplier with a first and a second input port for receiving two redundant binary (RB) numbers at said first and second input ports respectively, and performing a multiplication operation of said two received RB numbers so as to find a product thereof represented in RB number representation;

a first converter for receiving, as a mantissa of a normalized floating-point number X, a binary number made up of a plurality of digits including a non zero-value digit that is positioned upward one place from a binary point of said received binary number, performing a conversion of said received binary number into an RB number, and providing said RB number obtained by said binary-to-RB conversion to said first input port of said multiplier;

a digit-position alignment adder (DAA) with a third and a fourth input port for receiving two RB numbers at said third and fourth input ports respectively, and performing a digit-position alignment addition operation of said two received RB numbers respectively supplied at said third and fourth input ports so as to find a sum thereof represented in RB number representation;

a second converter for receiving, as a mantissa of another normalized floating-point number Y, a binary number made up of a plurality of digits including a non zero-value digit that is positioned upward one place from a binary point of said received binary number, performing a conversion of said received binary number into an RB number, and providing said RB number obtained by said binary-to-RB conversion to said third input port of said DAA;

a shifter for right-shifting a product found by said multiplier by a specific shift amount, and providing an RB number obtained by said right-shift operation to said fourth input port of said DAA;

a mantissa register for holding an RB number indicative of a sum found by said DAA, and providing said held RB number to said second input port of said multiplier; and a reverse converter for performing a conversion of an RB number held in said mantissa register into a binary number, and providing to said shifter a shift amount that is determined on the basis of a series of specific digits that are positioned upward two and more places from a binary point of said binary number obtained by said RB-to-binary conversion, as a specific shift amount for the right-shift operation by said shifter.

15. An iterative arithmetic processor as in claim 14, wherein said reverse converter performs the function of determining the amount of right-shift operation by said shifter on the basis of two specific digits that are respectively positioned upward two places and three places from a binary point of a binary number obtained by said RB-to-binary conversion.

16. An iterative arithmetic processor as in claim 14, further including:

first means with a fifth and a sixth input port for receiving a binary number that serves as an exponent of said normalized floating-point number X at said fifth input port, receiving another binary number at said sixth input port, performing an addition operation of said two received binary numbers so as to find a sum thereof represented in binary representation, and making an adjustment to said sum depending on the amount of right-shift operation by said shifter so as to find a binary-coded, adjusted exponent;

second means with a seventh and an eighth input port for receiving a binary number indicative of an adjusted exponent found by said first means at said seventh input port, receiving another binary number that serves as an exponent of said normalized floating-point number Y at said eighth input port, performing a compare operation of said two received binary numbers to determine which one of the binary numbers is greater in magnitude than the other, controlling the execution of the digit-position alignment addition operation by said DAA depending on a result of the compare operation, and providing the greater of said two received binary numbers; and an exponent register for holding a binary number from said second means, and providing said held binary number to said sixth input port of said first means.

17. An iterative arithmetic processor as in claim 16, wherein said second means has:

a comparator for performing a compare operation of two binary numbers respectively supplied at said seventh and eighth input ports to determine which one of the binary numbers is greater than the other, setting a swap signal to 0 and providing the swap signal if said binary number supplied at said seventh input port is found greater than said binary number supplied at said eighth input port, otherwise setting a swap signal to 1 and providing the swap signal, and providing an absolute value of a difference between said two binary numbers supplied at said seventh and eighth input ports as shift information; and a selector for giving output according to the swap signal from said comparator so that said selector selects and outputs either a binary number supplied at said seventh input port if the swap signal is 0 or a binary number supplied at said eighth input port if the swap signal is 1.

18. An iterative arithmetic processor as in claim 17, wherein said DAA has:

a swapper with a first and a second output port wherein an RB number supplied at said third input port and an RB number supplied at said fourth input port are respectively output from said first output port and from said second output port if said comparator provides the swap signal of 0, whereas, if said comparator provides the swap signal of 1, an RB number supplied at said third input port and an RB number supplied at said fourth input port are respectively output from said second output port and from said first output port;

a digit-position alignment shifter (DAS) for right-shifting an RB number from said first output port of said swapper by a shift amount that is designated by shift information from said comparator, and providing an RB number obtained by said right-shift operation; and an adder for performing an addition operation of an RB number from said second output port of said swapper and an RB number from said DAS so as to find a sum thereof represented in RB number representation.

19. An iterative arithmetic processor comprising:

a multiplier with a first and a second input port for receiving two redundant binary (RB) numbers at said first and second input ports respectively, and performing a multiplication operation of said two received RB numbers to find a product thereof represented in RB number representation;

a first converter for receiving, as a mantissa of a normalized floating-point number X, a binary number made up of a plurality of digits including a non zero-value digit that is positioned upward one place from a binary point of said received binary number, performing a conversion of said received binary number into an RB number, and providing said RB number obtained by said binary-to-RB conversion to said first input port;

a second converter for receiving, as a mantissa of another normalized floating-point number Y, a binary number made up of a plurality of digits including a non zero-value digit that is positioned upward one place from a binary point of said received binary number, performing a conversion of said received binary number into an RB number, and providing said RB number obtained by said binary-to-RB conversion to said second input port;

a digit-position alignment adder (DAA) with a third and a fourth input port for receiving an RB number indicative of a product found by said multiplier at said third input port, receiving another RB number at said fourth input port, and performing a digit-position alignment addition operation of said two received RB numbers so as to find a sum thereof represented in RB number representation;

a shifter for right-shifting a sum found by said DAA by a specific shift amount, and providing an RB number obtained by said right-shift operation;

a mantissa register for holding an RB number from said shifter, and providing said held RB number to said fourth input port; and a reverse converter for performing a conversion of an RB number held in said mantissa register into a binary number, and providing to said shifter a shift amount that is determined on the basis of a specific digit that is positioned upward three or more places from a binary point of said binary number obtained by said RB-to-binary conversion as a specific shift amount for the right-shift operation by said shifter.

20. An iterative arithmetic processor as in claim 19, wherein said reverse converter performs the function of determining the amount of right-shift operation by said shifter on the basis of a digit that is positioned upward three places from a binary point of a binary number obtained by said RB-to-binary conversion.

21. An iterative arithmetic processor as in claim further including:

an adder with a fifth and a sixth input port for receiving a binary number that serves as an exponent of said normalized floating-point number X at said fifth input port, receiving another binary number that serves as an exponent of said normalized floating-point number Y at said sixth input port, and performing an addition operation of said two received binary numbers so as to find a sum thereof represented in binary representation;

first means for making an adjustment to an input binary number depending upon the amount of right-shift operation by said shifter so as to find a binary-coded, adjusted exponent;

second means with a seventh and an eighth input port for receiving a binary number indicative of an adjusted exponent from said first means at said seventh input port, receiving a binary number indicative of a sum found by said adder at said eighth input port, performing a compare operation of said two received binary numbers to determine which one of the binary numbers is greater in magnitude than the other, controlling the execution of the digit-position alignment addition operation by said DAA according to a result of the compare operation, and providing the greater of said two received binary numbers; and an exponent register for holding a binary number from said second means, and providing said held binary number to said first means.

22. An iterative arithmetic processor as in claim 21, wherein said second means has:

a comparator for performing a compare operation of two binary numbers respectively supplied at said seventh and eighth input ports to determine which one of the binary numbers is greater than the other, setting a swap signal to 0 and providing the swap signal if said binary number supplied at said seventh input port is found greater than said binary number supplied at said eighth input port, otherwise setting a swap signal to 1 and providing the swap signal, and providing an absolute value of a difference between said two binary numbers supplied at said seventh and eighth input ports as shift information; and a selector for giving output according to the swap signal from said comparator so that said selector selects and outputs either a binary number supplied at said seventh input port if the swap signal is 0 or a binary number supplied at said eighth input port if the swap signal is 1.

23. An iterative arithmetic processor as in claim 22, wherein said DAA has:

a swapper with a first and a second output port, wherein an RB number supplied at said third input port and an RB number supplied at said fourth input port are respectively output from said first output port and from said second output port if said comparator provides the swap signal of 0, whereas, if said comparator provides the swap signal of 1, an RB number supplied at said third input port and an RB number supplied at said fourth input port are respectively output from said second output port and from said first output port;

a digit-position alignment shifter (DAS) for right-shifting an RB number from said first output port of said swapper by a shift amount that is designated by shift information from said comparator, and providing an RB number obtained by said right-shift operation; and an adder for performing an addition operation of an RB number from said second output port of said swapper and an RB number from said DAS so as to find a sum thereof represented in RB number representation.

24. An iterative arithmetic processor as in claim 22 further including a shift-amount selector that is arranged between said reverse converter and said shifter for providing, as a specific shift amount for said right-shift operation by said shifter, either a shift amount determined by said reverse converter if said comparator outputs the swap signal of 0 or a shift amount of 0 if said comparator outputs the swap signal of 1, to said shifter.

25. An iterative arithmetic processor comprising:

a digit-position alignment adder (DAA) with a first and a second input port for receiving two redundant binary (RB) numbers at said first and second input ports respectively, and performing a digit-position alignment addition operation of said two received RB numbers so as to find a sum thereof represented in RB number representation;

a converter for receiving, as a mantissa of a normalized floating-point number X, a binary number made up of a plurality of digits including a non zero-value digit that is positioned upward one place from a binary point of said received binary number, performing a conversion of said received binary number into an RB number, and providing said RB number obtained by said binary-to-RB conversion to said first input port;

a shifter for right-shifting a sum found by said DAA by a specific shift amount, and providing an RB number obtained by said right-shift operation;

a mantissa register for holding an RB number from said shifter, and providing said held RB number to said second input port; and a reverse converter for performing a conversion of an RB number held in said mantissa register into a binary number, and providing to said shifter a shift amount that is determined on the basis of a specific digit that is positioned upward two or more places from a binary point of said binary number obtained by said RB-to-binary conversion, as a specific shift amount for the right-shift operation by said shifter.

26. An iterative arithmetic processor as in claim 25, wherein said reverse converter performs the function of determining the amount of right-shift operation by said shifter on the basis of a digit that is positioned upward two places from a binary point of a binary number obtained by said RB-to-binary conversion.

27. An iterative arithmetic processor as in claim 25 further including:

first means for making an adjustment to an input binary number depending on the amount of right-shift operation by said shifter so as to find a binary-coded, adjusted exponent;

second means with a third and a fourth input port for receiving a binary number indicative of an adjusted exponent from said first means at said third input port, receiving a binary number that serves as an exponent of said normalized floating-point number X at said fourth input port, performing a compare operation of said two received binary numbers to determine which one of the binary numbers is greater in magnitude than the other, controlling the execution of the digit-position alignment addition operation by said DAA on the basis of a result of the compare operation, and providing the greater one of said two received binary numbers; and an exponent register for holding a binary number from said second means, and providing said held binary number to said first means.

28. An iterative arithmetic processor as in claim 27, wherein said second means has:

a comparator for performing a compare operation of two binary numbers respectively supplied at said third and fourth input ports to determine which one of the binary numbers is greater than the other, setting a swap signal to 0 and providing the swap signal if said binary number supplied at said third input port is found greater than said binary number supplied at said fourth input port, otherwise setting a swap signal to 1 and providing the swap signal, and providing an absolute value of a difference between said two binary numbers supplied at said third and fourth input ports as shift information; and a selector for giving output according to the swap signal from said comparator so that said selector selects and outputs either a binary number supplied at said third input port if the swap signal is 0 or a binary number supplied at said fourth input port if the swap signal is 1.

29. An iterative arithmetic processor as in claim 28, wherein said DAA has:

a swapper with a first and a second output port wherein an RB number supplied at said first input port and an RB number supplied at said second input port are respectively output from said first output port and from said second output port if said comparator provides the swap signal of 0, whereas, if said comparator provides the swap signal of 1, an RB number supplied at said first input port and an RB number supplied at said second input port are respectively output from said second output port and from said first output port;

a digit-position alignment shifter (DAS) for right-shifting an RB number from said first output port of said swapper by a shift amount that is designated by shift information from said comparator, and providing an RB number obtained by said right-shift operation; and an adder for performing an addition operation of an RB number from said second output port of said swapper and an RB number from said DAS so as to find a sum thereof represented in RB number representation.

30. An iterative arithmetic processor as in claim 28 further including a shift-amount selector that is arranged between said reverse converter and said shifter for providing, as a specific shift amount for said right-shift operation by said shifter, either a shift amount determined by said reverse converter if said comparator outputs the swap signal of 0 or a shift amount of 0 if said comparator outputs the swap signal of 1, to said shifter.

* * * * *

UNITED STATES PATENT AND TRADEMARK OFFICE
CERTIFICATE OF CORRECTION

PATENT NO. : 5,570,309
DATED : October 29, 1996
INVENTOR(S) : Akira MIYOSHI et al.

It is certified that error appears in the above-indentified patent and that said Letters Patent is hereby corrected as shown below:

<u>Col. 21</u>, line 5, after "claim", insert --19,--.

Signed and Sealed this

Third Day of March, 1998

*Attest:*

BRUCE LEHMAN

*Attesting Officer*     *Commissioner of Patents and Trademarks*